US011194352B2

(12) United States Patent
McComb et al.

(10) Patent No.: US 11,194,352 B2
(45) Date of Patent: Dec. 7, 2021

(54) FLOW AND PRESSURE STABILIZATION SYSTEMS, METHODS, AND DEVICES

(71) Applicant: BLACOH FLUID CONTROLS, INC., Riverside, CA (US)

(72) Inventors: David Dean McComb, Highland, CA (US); Alvin Ye, Ontario, CA (US); James Stanley Burke, Glendora, CA (US); Gregory Scott Duncan, Huntington Beach, CA (US)

(73) Assignee: BLACOH FLUID CONTROLS, INC., Riverside, CA (US)

( * ) Notice: Subject to any disclaimer, the term of this patent is extended or adjusted under 35 U.S.C. 154(b) by 184 days.

(21) Appl. No.: 16/506,042

(22) Filed: Jul. 9, 2019

(65) Prior Publication Data

US 2019/0332130 A1    Oct. 31, 2019

Related U.S. Application Data

(63) Continuation of application No. 15/769,191, filed as application No. PCT/US2017/064342 on Dec. 1, 2017, now Pat. No. 10,353,409.

(Continued)

(51) Int. Cl.
*G05D 16/06* (2006.01)
*F16K 31/126* (2006.01)
(Continued)

(52) U.S. Cl.
CPC ........ *G05D 16/0655* (2013.01); *F15B 13/00* (2013.01); *F16K 17/04* (2013.01);
(Continued)

(58) Field of Classification Search
CPC ............... G05D 16/0655; G05D 16/0402; F16K 17/04; F16K 17/06; F16K 31/126; F16K 31/385
See application file for complete search history.

(56) References Cited

U.S. PATENT DOCUMENTS

| D96,405 S | 7/1935 | Murphy |
| 2,523,826 A | 9/1950 | Heinzelman |

(Continued)

FOREIGN PATENT DOCUMENTS

| DE | 804 635 C | 4/1951 |
| GB | 668451 | 3/1952 |

OTHER PUBLICATIONS

International Search Report and Written Opinion for Application No. PCT/US2017/064342, dated Feb. 7, 2018, in 16 pages.

*Primary Examiner* — P. Macade Nichols
(74) *Attorney, Agent, or Firm* — Knobbe, Martens, Olson & Bear, LLP

(57) ABSTRACT

A flow and pressure stabilization device includes a housing; a first fluid chamber; a gas chamber; a deformable bladder that separates the first fluid chamber from the gas chamber, the deformable bladder comprising a longitudinally protruding portion shaped such that, when a pressure in the gas chamber is greater than a pressure in the first fluid chamber, the longitudinally protruding portion extends toward the first fluid chamber; and a valve in fluid communication with a fluid outlet, the valve including: a second fluid chamber in fluid communication with the first fluid chamber; a fluid port in fluid communication with the fluid outlet; and a deformable diaphragm positioned adjacent to and biased toward the fluid port.

22 Claims, 17 Drawing Sheets

US 11,194,352 B2
Page 2

Related U.S. Application Data

(60) Provisional application No. 62/430,228, filed on Dec. 5, 2016.

(51) Int. Cl.
*F16K 31/385* (2006.01)
*F16K 17/04* (2006.01)
*F16K 17/06* (2006.01)
*G05D 7/01* (2006.01)
*G05D 16/04* (2006.01)
*F16K 47/16* (2006.01)
*F15B 13/00* (2006.01)

(52) U.S. Cl.
CPC .......... *F16K 17/06* (2013.01); *F16K 31/126* (2013.01); *F16K 31/385* (2013.01); *F16K 47/16* (2013.01); *G05D 7/0106* (2013.01); *G05D 16/0402* (2019.01)

(56) References Cited

U.S. PATENT DOCUMENTS

| | | |
|---|---|---|
| 2,540,424 A | 2/1951 | Bures et al. |
| 2,633,146 A | 3/1953 | Witt |
| 2,638,932 A | 5/1953 | Lee |
| 2,774,374 A | 12/1956 | Schneider |
| 3,052,378 A | 9/1962 | Wright et al. |
| 3,418,708 A | 12/1968 | Siver |
| 3,470,910 A | 10/1969 | Loveless |
| D218,519 S | 8/1970 | Hisayoshi |
| 4,190,403 A | 2/1980 | Glover |
| 4,273,158 A | 6/1981 | Chun |
| D282,562 S | 2/1986 | Looney |
| 4,610,369 A | 9/1986 | Jacques |
| 4,782,204 A | 11/1988 | Gartland |
| 4,802,507 A | 2/1989 | Willson |
| 5,065,788 A | 11/1991 | McManigal et al. |
| 5,186,209 A | 2/1993 | McManigal et al. |
| D341,187 S | 11/1993 | Stachowiak |
| 5,307,782 A | 5/1994 | Davis |
| 5,372,116 A | 12/1994 | Davis |
| 6,041,821 A | 3/2000 | Kurt |
| 6,173,735 B1 | 1/2001 | Perry, Jr. et al. |
| 6,386,509 B1 | 5/2002 | Mastuzawa et al. |
| 8,733,392 B2 | 5/2014 | Smith et al. |
| 8,875,741 B2 | 11/2014 | Jae |
| 9,915,957 B2 * | 3/2018 | Brice ................ G05D 16/0655 |
| 10,508,750 B2 | 12/2019 | Burris |
| 2014/0081217 A1 | 3/2014 | Holtwick |
| 2014/0203198 A1 | 7/2014 | Jennings et al. |
| 2015/0027567 A1 | 1/2015 | Shreve et al. |

* cited by examiner

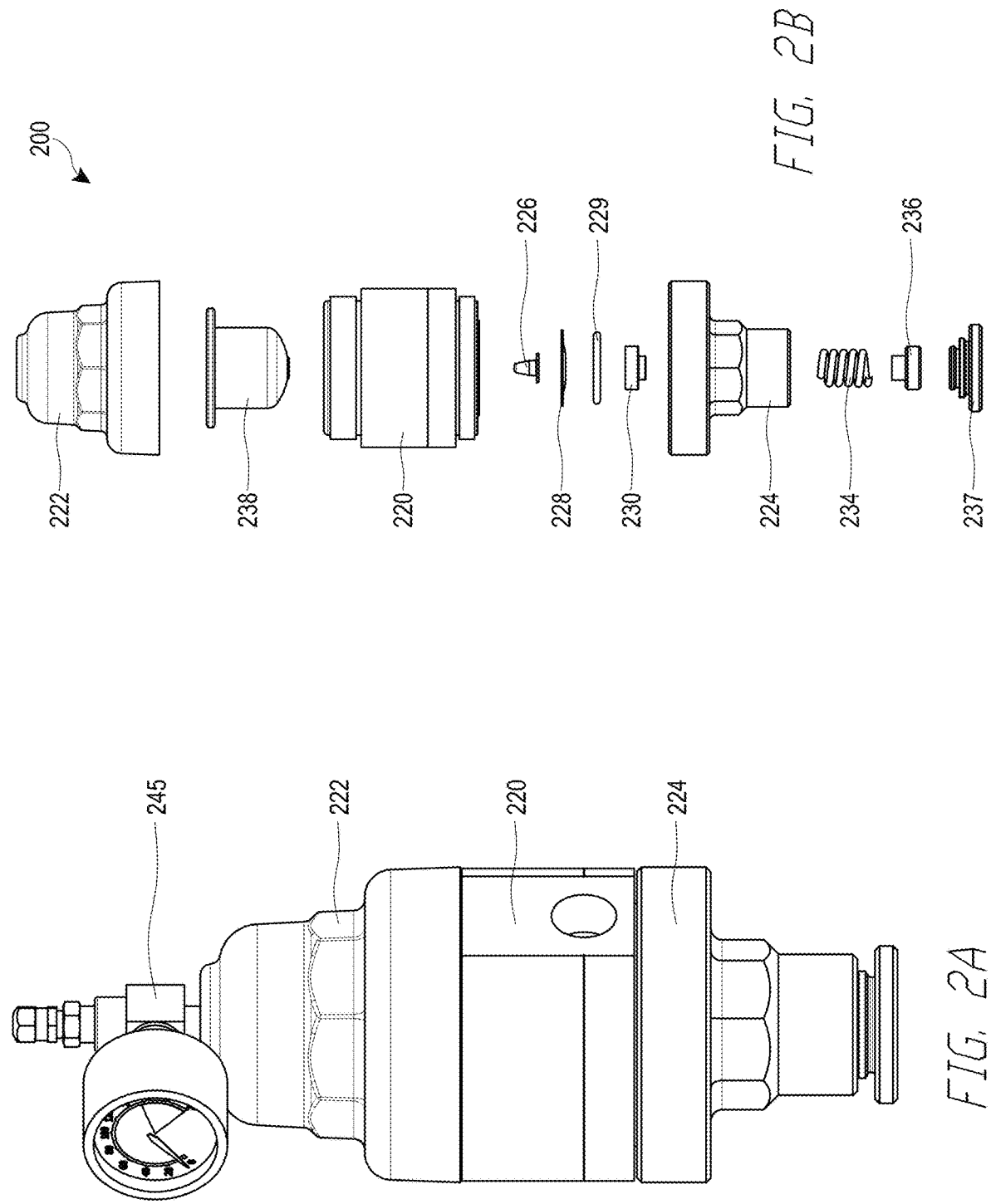

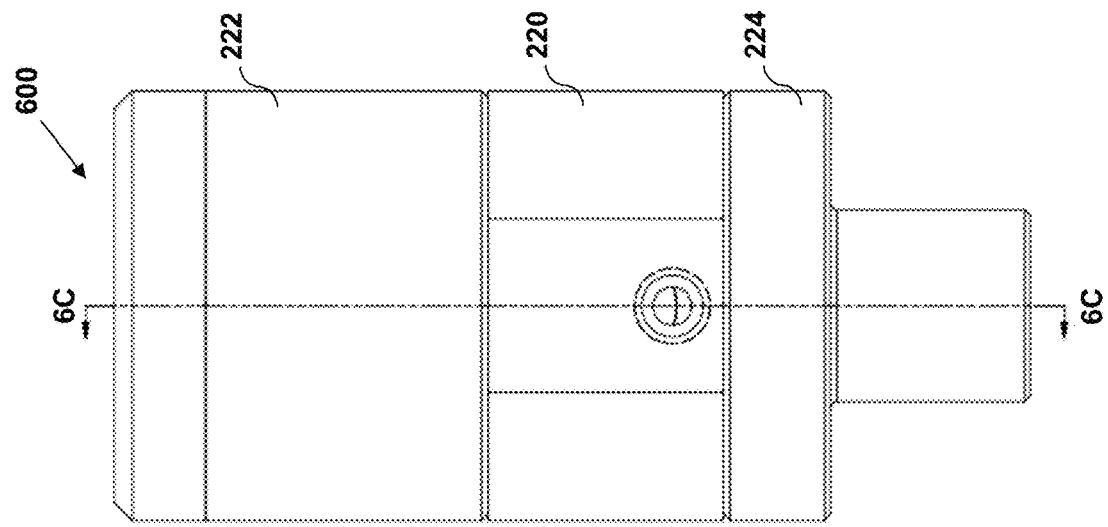
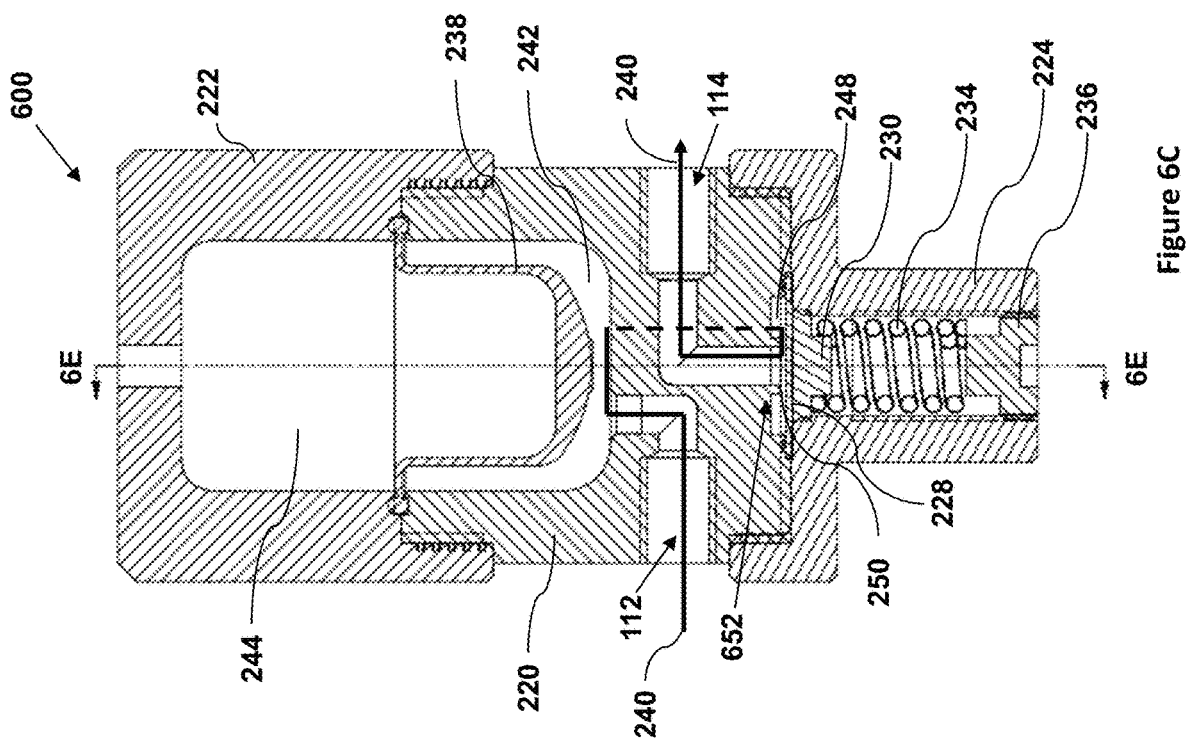

US 11,194,352 B2

FLOW AND PRESSURE STABILIZATION SYSTEMS, METHODS, AND DEVICES

CROSS-REFERENCE TO RELATED APPLICATIONS

This application is a continuation of U.S. patent application Ser. No. 15/769,191, titled FLOW AND PRESSURE STABILIZATION SYSTEMS, METHODS, AND DEVICES, filed on Apr. 18, 2018, which is a National Stage of PCT Application No. PCT/US2017/064342, titled FLOW AND PRESSURE STABILIZATION SYSTEMS, METHODS, AND DEVICES, filed on Dec. 1, 2017, which claims the benefit of U.S. Provisional Application No. 62/430,228, titled FLOW AND PRESSURE STABILIZATION SYSTEMS, METHODS, AND DEVICES, filed on Dec. 5, 2016. Each of the foregoing applications is hereby incorporated by reference herein in its entirety.

BACKGROUND

Field

This disclosure generally relates to systems, methods, and devices for stabilizing fluid flow and pressure in fluid piping systems.

Description

Hydraulic systems, such as fluid piping systems, are used to transport fluid under pressure in various applications. One example is a chemical dosing application where chemicals are introduced into a fluid flow stream. For example, in a water treatment plant, one or more chemicals may be introduced into a water supply stream to sanitize the water for consumption or to otherwise make the water suitable for a particular purpose. It can be important to control the amount of chemical being introduced into a fluid stream, and thus some chemical dosing systems utilize metering pumps. One disadvantage of metering pumps, however, is that they tend to produce a pulsed output that can lead to instability in the fluid flow and/or less predictability in the chemical output.

SUMMARY

The disclosure herein provides various embodiments of flow and pressure stabilization systems, methods, and devices. In some embodiments, a flow and pressure stabilization device provides stabilization to a fluid pump and piping system by, among other things, reducing, dampening, and/or absorbing pulsations in fluid flow, maintaining upstream pressure, and increasing linearity of a downstream flow, enabling optimum system performance. In some embodiments, a flow and pressure stabilization system comprises a flow control button, plunger, needle, and/or the like comprising an outer profile shaped to cooperate with a fluid port such that an effective fluid passage size through the fluid port is changed based on a relative position of the flow control button with respect to the fluid port. The change in effective fluid passage size can, among other things, create a variable restriction or obstruction to fluid flow, enabling relatively fine control of upstream and/or downstream pressure and/or flow. In some embodiments, the flow control button is coupled to a diaphragm positioned to sense upstream and/or downstream pressure (e.g., to deform in response to a fluid pressure on one side of the diaphragm working against a spring load and/or pressure on an opposite side of the diaphragm), and the relative position of the flow control button with respect to the fluid port changes based at least partially on a level of fluid pressure applied to the diaphragm. In some embodiments, pulsations in fluid flow can be configured to be reduced, dampened, and/or absorbed by a gas chamber positioned adjacent the diaphragm and/or a separate deformable separator (e.g., diaphragm, bladder, bellows, membrane, and/or the like).

According to some embodiments, a flow and pressure stabilization device comprises: a housing comprising a fluid inlet and a fluid outlet; a first fluid chamber within the housing and in fluid communication with the fluid inlet; a gas chamber within the housing; a deformable bladder that separates the first fluid chamber from the gas chamber and at least partially defines a volume of the first fluid chamber; a second fluid chamber within the housing and in fluid communication with the first fluid chamber via a fluid passage; and a variable flow valve in fluid communication with the fluid outlet and the second fluid chamber, the variable flow valve comprising: a fluid port in fluid communication with the fluid outlet; a deformable diaphragm positioned adjacent the fluid port, the diaphragm at least partially defining a volume of the second fluid chamber; and an outflow control button (e.g., plunger, restrictor, bullet, protruding member, and/or the like) coupled to the diaphragm and extending at least partially into the fluid port, the outflow control button comprising an at least partially tapered surface, the outflow control button being translatable with respect to the fluid port, wherein the diaphragm of the variable flow valve is configured such that an increase in pressure within the second fluid chamber can cause the diaphragm to deform and the outflow control button to translate with respect to the fluid port, causing a clearance between the at least partially tapered surface of the outflow control button and an inner surface of the fluid port to change.

In some embodiments, the housing comprises a first end and a second end, the second end being opposite the first end, wherein the bladder is positioned such that an increase in pressure in the first fluid chamber will tend to cause the bladder to deform toward the first end, and wherein the diaphragm is positioned such than an increase in pressure in the second fluid chamber will tend to cause the diaphragm to deform toward the second end. In some embodiments, the bladder and the diaphragm are concentrically aligned along a longitudinal axis of the housing. In some embodiments, the at least partially tapered surface of the outflow control button is an outer surface of the outflow control button. In some embodiments, the outflow control button comprises a cylindrical outer surface, and the at least partially tapered surface of the outflow control button is within a groove of the outflow control button. In some embodiments, the fluid passage comprises a length that is no greater than an outer diameter of the housing. In some embodiments, the fluid passage comprises a length that is no greater than a diameter of the first fluid chamber. In some embodiments, the fluid passage comprises a length that is no greater than two times a diameter of the first fluid chamber. In some embodiments, the variable flow valve comprises a closed configuration wherein a laterally extending annular surface of the outflow control button is in contact with an annular shaped face of the fluid port. In some embodiments, the variable flow valve comprises a closed configuration wherein the diaphragm is in contact with an annular shaped face of the fluid port. In some embodiments, the variable flow valve further comprises a spring configured to bias the diaphragm toward the fluid port.

According to some embodiments, a flow and pressure stabilization device comprises: a housing comprising a fluid inlet and a fluid outlet; a fluid port in fluid communication with the fluid inlet and fluid outlet; a plunger (e.g., button, restrictor, bullet, protruding member, and/or the like) translatable with respect to the fluid port, the plunger having an at least partially non-constant outer profile (e.g., comprising one or more of a taper, curve, step, groove, slot, flat and/or the like) configured to cause a clearance between an outer surface of the plunger and an inner surface of the fluid port to change with translation of the plunger with respect to the fluid port, wherein the plunger is biased in a direction toward the fluid port; a fluid chamber in fluid communication with the fluid inlet and the fluid port; and a diaphragm coupled to the plunger and at least partially defining the fluid chamber, wherein the diaphragm is deformable to change a volume of the fluid chamber.

In some embodiments, the plunger is biased in the direction toward the fluid port at least partially by a mechanical spring. In some embodiments, the flow and pressure stabilization device further comprises a gas chamber in fluid communication with the diaphragm and positioned such that deformation of the diaphragm that increases a volume of the fluid chamber will decrease a volume of the gas chamber, wherein the plunger is biased in the direction toward the fluid port at least partially by a gas pressure in the gas chamber. In some embodiments, the profile of the plunger comprises at least two tapered sections having different taper angles. In some embodiments, the profile of the plunger comprises at least one non-tapered section adjacent a tapered section.

According to some embodiments, an interchangeable outflow control button assembly for use in a flow and pressure stabilization device comprises: a diaphragm comprising a resilient material, the diaphragm comprising a deformable central portion and an annular sealing portion, the annular sealing portion extending about a periphery of the diaphragm and defining a transverse plane; and an outflow control button coupled to and extending from a center of the deformable central portion of the diaphragm, the outflow control button comprising a longitudinal axis oriented perpendicular to the transverse plane, wherein the outflow control button comprises an at least partially tapered surface, and wherein the diaphragm and outflow control button are sized and shaped to be installable into a valve housing comprising a diaphragm seat and a fluid port, the outflow control button configured to be positioned at least partially through the fluid port and to be translatable with respect to the fluid port to change an amount of clearance between an outer surface of the outflow control button and an inner surface of the fluid port.

In some embodiments, the at least partially tapered surface of the outflow control button is an outer surface of the outflow control button. In some embodiments, the outflow control button comprises a cylindrical outer surface, and the at least partially tapered surface of the outflow control button is within a groove of the outflow control button. In some embodiments, the outflow control button comprises a base having a laterally extending annular shaped portion shaped to abut a face of the fluid port in a closed position.

According to some embodiments, a flow and pressure stabilization device comprises: a housing comprising a fluid inlet and a fluid outlet; a fluid port positioned within the housing and in fluid communication with the fluid inlet and fluid outlet; and an outflow control button positioned at least partially through the fluid port to restrict fluid from flowing through the fluid port, wherein the outflow control button comprises an at least partially tapered shape, wherein the outflow control button is translatable with respect to the fluid port, and wherein the outflow control button is positioned with respect to the fluid port such that translation of the outflow control button with respect to the fluid port will change an amount of clearance between an outer surface of the outflow control button and an inner surface of the fluid port.

In some embodiments, the outflow control button is biased in a direction that tends to close the fluid port. In some embodiments, the outflow control button is biased at least partially by a mechanical spring. In some embodiments, the flow and pressure stabilization device further comprises: a fluid chamber in fluid communication with the fluid port; a deformable separator (e.g., diaphragm, bladder, bellows, membrane, and/or the like) at least partially defining a volume of the fluid chamber; and a gas chamber in fluid communication with the deformable separator and positioned such that deformation of the deformable separator that increases a volume of the fluid chamber will decrease a volume of the gas chamber. In some embodiments, the outflow control button is biased, in a direction that tends to close the fluid port, at least partially by a gas pressure in the gas chamber. In some embodiments, a profile of the outflow control button comprises at least one tapered portion. In some embodiments, the profile of the outflow control button further comprises at least one non-tapered portion. In some embodiments, a profile of the outflow control button comprises at least two tapered portions having different taper angles.

According to some embodiments, a flow and pressure stabilization device comprises: a diaphragm comprising a resilient material; and an outflow control button coupled to the diaphragm, the outflow control button comprising an at least partially tapered shape, wherein the diaphragm and outflow control button are sized and shaped to be installable into a backpressure valve housing comprising a diaphragm seat and a fluid port, the outflow control button configured to be positioned at least partially through the fluid port and to be translatable with respect to the fluid port to change an amount of clearance between an outer surface of the outflow control button and an inner surface of the fluid port.

According to some embodiments, a flow and pressure stabilization device comprises: a housing comprising a fluid inlet and a fluid outlet; a dampener positioned within the housing and in fluid communication with the fluid inlet, the dampener comprising a variable volume fluid chamber defined at least partially by a bladder; and a back pressure valve positioned within the housing and in fluid communication with the dampener and the fluid outlet, the back pressure valve comprising a spring configured to apply a preload force to retain the back pressure valve in a closed position until a pressure is applied to the back pressure valve that overcomes the preload force.

According to some embodiments, a flow and pressure stabilization device comprises: a housing comprising a fluid inlet and a fluid outlet; a dampener positioned within the housing and in fluid communication with the fluid inlet, the dampener comprising a variable volume fluid chamber defined at least partially by a bladder; and a back pressure valve positioned within the housing and in fluid communication with the dampener and the fluid outlet, the back pressure valve comprising a fluid port having an outflow control button positioned at least partially therethrough to restrict fluid from flowing through the fluid port, wherein the outflow control button comprises an at least partially tapered shape, wherein the outflow control button is translatable with respect to the fluid port, and wherein the outflow control button is positioned with respect to the fluid port such that translation of the outflow control button with respect to the fluid port will change an amount of clearance between an outer surface of the outflow control button and an inner surface of the fluid port.

According to some embodiments, a flow and pressure stabilization device comprises: a housing comprising a fluid inlet and a fluid outlet; a fluid port positioned within the housing and in fluid communication with the fluid inlet and fluid outlet; and a flow restrictor positioned at least partially through the fluid port to restrict fluid from flowing through the fluid port, wherein the flow restrictor comprises a transverse width that varies along at least a portion of the flow restrictor's longitudinal length, wherein the flow restrictor is translatable with respect to the fluid port in a longitudinal direction, and wherein the flow restrictor is positioned with respect to the fluid port such that translation of the flow restrictor with respect to the fluid port will change an amount of clearance between a surface of the outflow control button and an inner surface of the fluid port.

In some embodiments, the flow restrictor is biased in a direction that tends to close the fluid port. In some embodiments, the flow restrictor is biased at least partially by a mechanical spring. In some embodiments, the flow and pressure stabilization device further comprises: a fluid chamber in fluid communication with the fluid port; a diaphragm at least partially defining a volume of the fluid chamber; and a gas chamber in fluid communication with the diaphragm and positioned such that deformation of the diaphragm that increases a volume of the fluid chamber will decrease a volume of the gas chamber. In some embodiments, the flow restrictor is biased, in a direction that tends to close the fluid port, at least partially by a gas pressure in the gas chamber. In some embodiments, a profile of the flow restrictor comprises at least one tapered, curved, slotted, grooved, or stepped portion. In some embodiments, the profile of the flow restrictor further comprises at least one non-tapered portion. In some embodiments, a profile of the flow restrictor comprises at least two tapered portions having different taper angles.

For purposes of this summary, certain aspects, advantages, and novel features of the inventions are described herein. It is to be understood that not necessarily all such advantages may be achieved in accordance with any particular embodiment of the inventions. Thus, for example, those skilled in the art will recognize that the inventions may be embodied or carried out in a manner that achieves one advantage or group of advantages as taught herein without necessarily achieving other advantages as may be taught or suggested herein.

BRIEF DESCRIPTION OF THE DRAWINGS

The foregoing and other features, aspects, and advantages of the present disclosure are described in detail below with reference to the drawings of various embodiments, which are intended to illustrate and not to limit the disclosure. The features of some embodiments of the present disclosure, which are believed to be novel, will be more fully disclosed in the following detailed description. The following detailed description may best be understood by reference to the accompanying drawings wherein the same numbers in different drawings represents the same parts. All drawings are schematic and are not intended to show any dimension to scale. The drawings comprise the following figures in which:

FIG. 2A illustrates an embodiment of a flow and pressure stabilization device.

FIG. 2B is an exploded view of the embodiment of FIG. 2A.

FIG. 6C is a section view of the embodiment of FIG. 6A.

FIG. 6D is a side view of the embodiment of FIG. 6A, showing the section location of FIG. 6C.

DETAILED DESCRIPTION

Although several embodiments, examples, and illustrations are disclosed below, it will be understood by those of ordinary skill in the art that the inventions described herein extend beyond the specifically disclosed embodiments, examples, and illustrations and include other uses of the inventions and obvious modifications and equivalents thereof. Embodiments of the inventions are described with reference to the accompanying figures, wherein like numerals refer to like elements throughout. These drawings are considered to be a part of the entire description of some embodiments of the inventions. The terminology used in the description presented herein is not intended to be interpreted in any limited or restrictive manner simply because it is being used in conjunction with a detailed description of certain specific embodiments of the inventions. In addition, embodiments of the inventions can comprise several novel features and no single feature is solely responsible for its desirable attributes or is essential to practicing the inventions herein described.

The disclosure herein presents various embodiments of fluid flow and pressure stabilization devices, methods, and systems. In some embodiments, a fluid flow and pressure stabilization device as disclosed herein is configured to reduce and/or absorb pulsations in fluid flow, maintain upstream pressure, and/or increase linearity of a downstream flow, enabling optimum system performance.

Fluid Flow and Pressure Stabilization System

Figure 1:
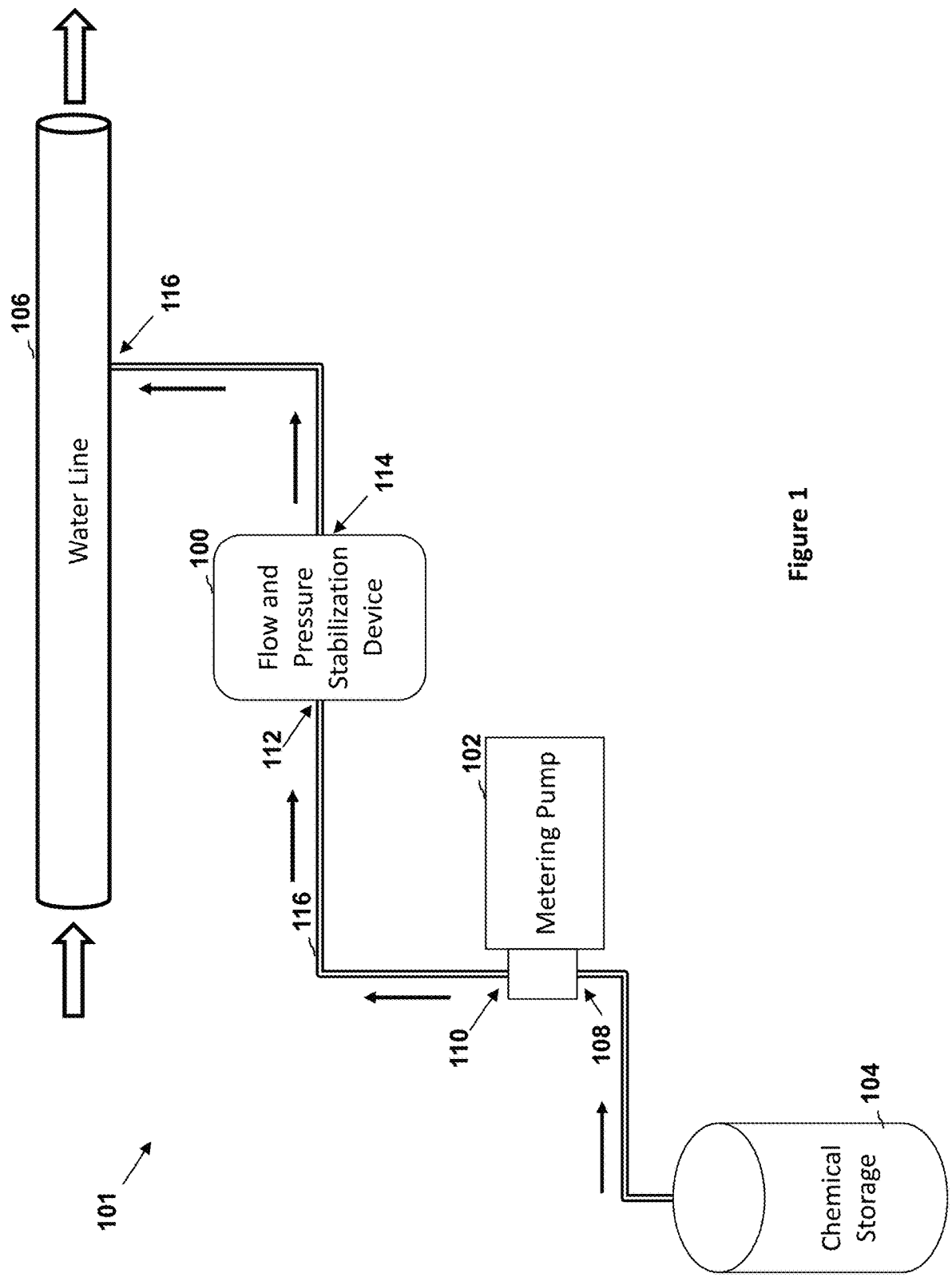
FIG. 1 is a schematic diagram of an embodiment of a chemical dosing system that comprises a fluid and pressure stabilization device.

FIG. 1 illustrates an example use case of a fluid flow and pressure stabilization device. Specifically, FIG. 1 illustrates a schematic diagram of an embodiment of a fluid flow and pressure stabilization system 101. In this embodiment, the fluid flow and pressure stabilization system 101 comprises a chemical dosing system that is configured to introduce precise amounts of a chemical, such as chlorine or the like, into a water stream to sanitize the water flowing therethrough. The system 101 comprises a chemical storage tank 104, a metering pump 102, a flow and pressure stabilization device 100, and a water line 106. These components of the system are fluidly connected via piping 116. In use, the metering pump 102 operates to receive a fluid from the chemical storage tank 104 at inlet 108 and to output that fluid at outlet 110.

The fluid output from the metering pump at outlet 110 will be a relatively unstable flow due to, among other things, the pulsing nature of the metering pump 102. Accordingly, it can be desirable to pass the fluid flow through the flow and pressure stabilization device 100 to stabilize the fluid flow prior to injecting the fluid into the water line 106. As can be seen in FIG. 1, the fluid flows from the outlet 110 of the metering pump 102 to the inlet 112 of the flow and pressure stabilization device 100. The fluid then flows from the outlet 114 of the flow and pressure stabilization device 100 into the water line 106 via injection point 116.

It should be noted that the diagram illustrated in FIG. 1 is a simplified schematic diagram of one example embodiment of a fluid flow and pressure stabilization system, to show one example context of how a flow and pressure stabilization device may be used. Other fluid systems may take other forms and/or include additional components. Further, the flow and pressure stabilization devices disclosed herein are not limited to being used in a chemical dosing system and/or with metering pumps. The fluid flow and pressure stabilization devices disclosed herein can be used in any hydraulic or fluid piping system wherein a more stable and/or linear flow is desirable.

The flow and pressure stabilization device 100 shown in FIG. 1 may take various forms. For example, any of the flow and pressure stabilization devices described herein and/or illustrated in more detail in other figures included herewith may be used as the flow and pressure stabilization device 100 in the system 101. Specific non-limiting examples of such fluid flow and pressure stabilization devices are given below with reference to flow and pressure stabilization devices 200, 600, and 700.

Example Features and Benefits of Fluid Flow and Pressure Stabilization Devices

Figure 3:
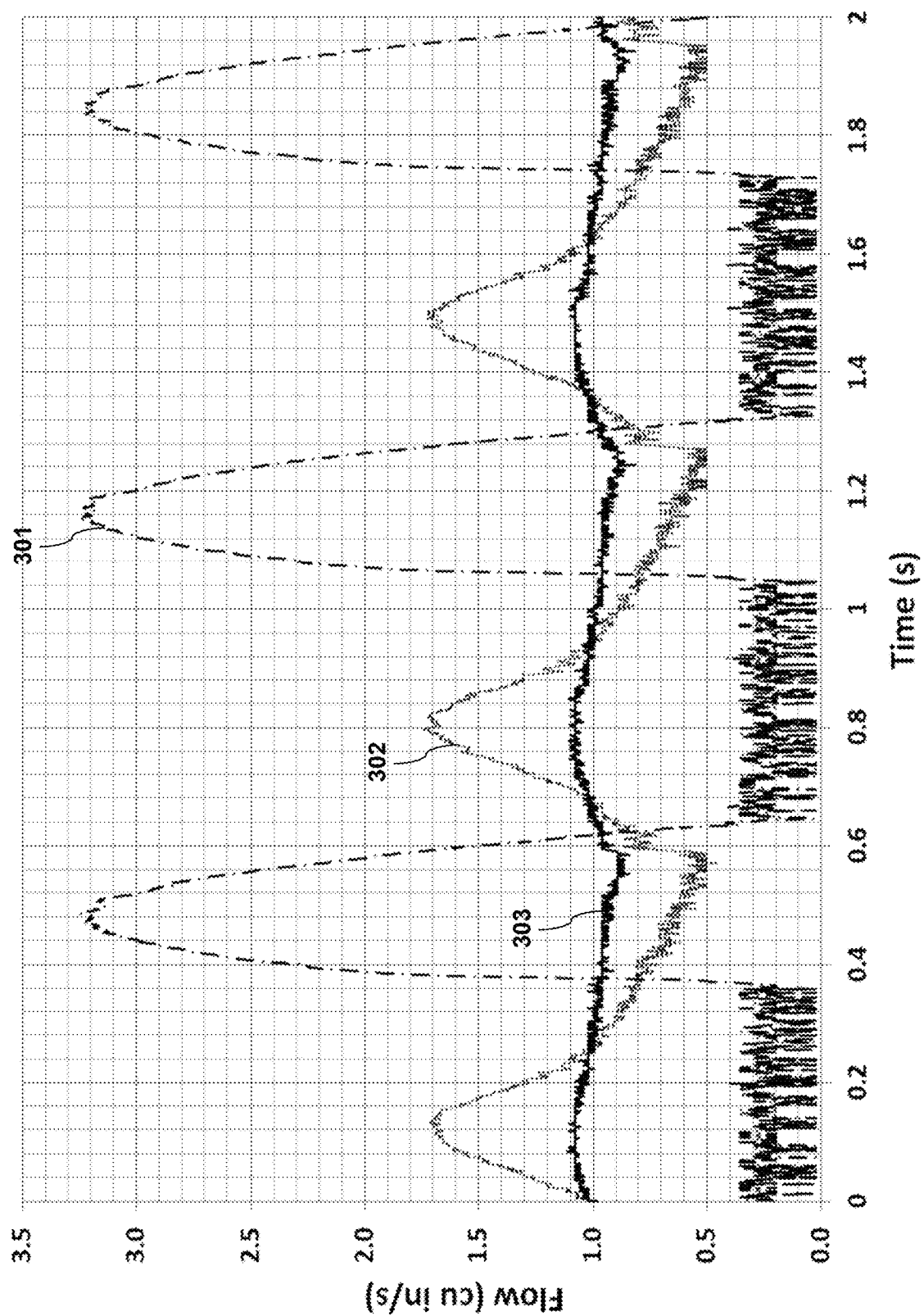
FIG. 3 illustrates a chart showing results of testing a flow and pressure stabilization device.

Various features of the embodiments disclosed herein can enable benefits such as reducing and/or absorbing pulsations in fluid flow, maintaining upstream pressure, and/or increasing linearity of a downstream flow (for example, as shown in the chart of FIG. 3, described below). For example, some embodiments disclosed herein comprise a variable flow valve that comprises a variable flow restrictor or obstructer (e.g., a flow control button, plunger, needle, and/or the like) comprising an outer profile shaped to cooperate with a fluid port of the variable flow valve such that an effective fluid passage size through the fluid port is changed based on a relative position of the variable flow restrictor with respect to the fluid port. In some embodiments, the flow restrictor is coupled to a diaphragm positioned to sense upstream and/or downstream pressure (e.g., to deform in response to a fluid pressure on one side of the diaphragm working against a spring load and/or pressure on an opposite side of the diaphragm), and the relative position of the flow restrictor with respect to the fluid port changes based at least partially on a level of fluid pressure applied to the diaphragm. Such a variable flow restrictor enables relatively fine control of downstream pressure. Further, pulsations in fluid flow can be configured to be absorbed by a bladder that separates a gas chamber from a fluid chamber that is in fluid communication with the fluid port. In some embodiments, the bladder is part of the diaphragm that is coupled to the flow restrictor. In some embodiments, the bladder is separate from the diaphragm that is coupled to the flow restrictor. In some embodiments, the diaphragm and the bladder are configured to each provide at least a portion of the pulsation dampening performed by the fluid pressure and stabilization device. For example, because some embodiments include the diaphragm and bladder in relatively close proximity (e.g., within the same housing), with the diaphragm and bladder being fluidly coupled in parallel with a fluid inlet of the fluid pressure and stabilization device (as opposed to in series), pulsations entering the fluid pressure and stabilization device may cause corresponding deformations to both the bladder and the diaphragm to deform, enabling each of those components to perform at least some pulsation dampening.

In some embodiments, a fluid flow and pressure stabilization device comprises a housing having a fluid inlet and a fluid outlet, with a fluid flow path therebetween. The device further comprises two deformable members that are configured to deform in response to pressure and/or pulses in the fluid flow through the device. In some embodiments, the two deformable members are positioned at opposite ends of the device and concentrically aligned (e.g., as shown in FIG. 2C). In some embodiments, each of the two deformable members is sealed within the housing such that each of the deformable members separates a fluid chamber that is in the fluid flow path from a second chamber that provides a biasing force that biases each of the deformable members in a direction that tends to make the corresponding fluid chamber have a smaller volume. In various embodiments, this biasing force may be produced in various ways. For example, the biasing force may be generated by a gas chamber that is charged with a pressurized compressible gas. As another example, the biasing force may be generated using mechanical means, such as with a spring that is configured to have a preload force against the deformable member. In some embodiments, a combination of mechanical methods, such as one or more springs, and pressurized gas are used to bias one or both of the deformable members. In some embodiments, one of the deformable members comprises a diaphragm (e.g., a relatively thin flexible membrane that may comprise a substantially flat disc shape in some embodiments, or may not be substantially flat in some embodiments), and the other of the deformable members comprises a bladder (e.g., an inflatable sack or chamber that is not a substantially flat shape). For example, with reference to FIG. 2C further described below, the flow and pressure stabilization device 200 comprises an upper bladder (e.g., deformable member 238) and a lower diaphragm (e.g., deformable member 228). One reason having these different shapes can be desirable is that that the two deformable members can provide different and/or complementary functionalities (although they may also both perform some of the same functionalities, but to varying degrees). For example in the embodiment illustrated in FIG. 2C, the lower deformable member 228 has an outflow control button 226 coupled thereto. Deformation of the lower deformable member 228 desirably results in a translational movement of the outflow control button 226 with respect to a fluid port 250. By using a diaphragm for the lower deformable member 228, the translational movement of the outflow control button 226 can desirably be more precisely controlled. On the other hand, it can be desirable to use a bladder for the upper deformable member 238, to allow for a greater increase in volume of the fluid chamber 242 in response to pulsations in the fluid pressure than might be available if the upper deformable member 238 were flat.

Figure 2D:
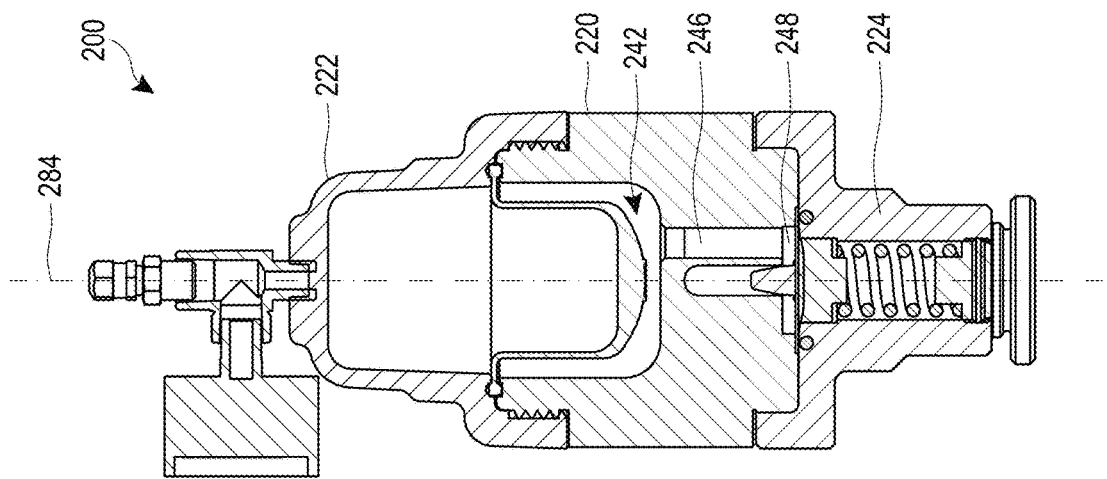
FIG. 2D is another section view of the embodiment of FIG. 2A.
Figure 2C:
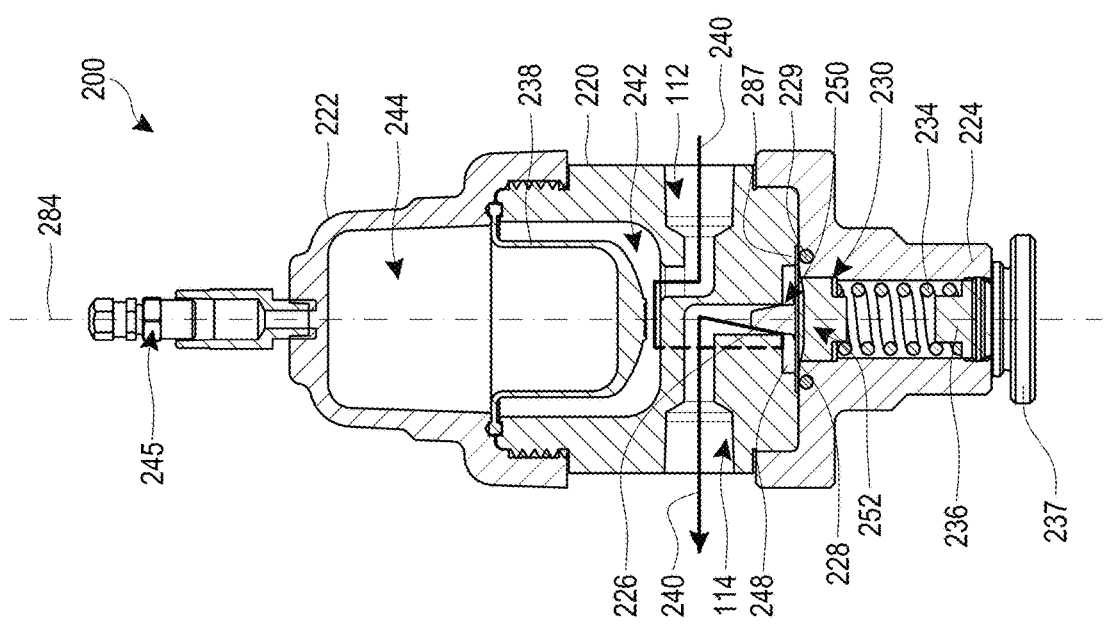
FIG. 2C is a section view of the embodiment of FIG. 2A.

It can be desirable in some embodiments for the upper and lower deformable members (e.g., the upper and lower deformable members 238, 228 of FIG. 2C) to be coaxially aligned and positioned at opposite ends of a housing, with the fluid inlets and outlets 112, 114 positioned between the two deformable members because this can, among other things, reduce or minimize the distance between the upper fluid chamber 242 and lower fluid chamber 248 (e.g., the length of fluid passage 246 of FIG. 2D). Reducing or minimizing this distance can enable more efficient and effective smoothing of an irregular fluid flow. One reason for this is that the relatively small distance between the upper and lower fluid chambers 242, 248 can help to reduce or eliminate transient waves in the fluid flow between these two chambers. Although it can be desirable to have the two deformable members be coaxially aligned, they do not necessarily have to be coaxially aligned. Having them be coaxially aligned can, however, help to make the assembly process easier and/or to reduce the cost to manufacture a fluid flow and pressure stabilization device as disclosed herein.

Figure 7A:
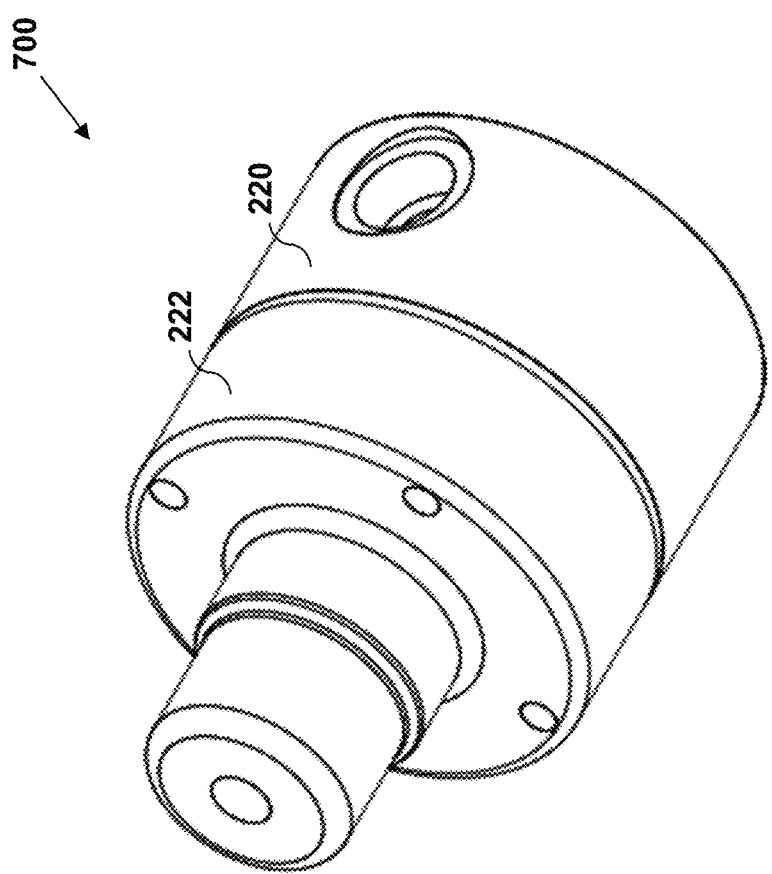
FIG. 7A is an isometric view of another embodiment of a flow and pressure stabilization device.
Figure 7B:
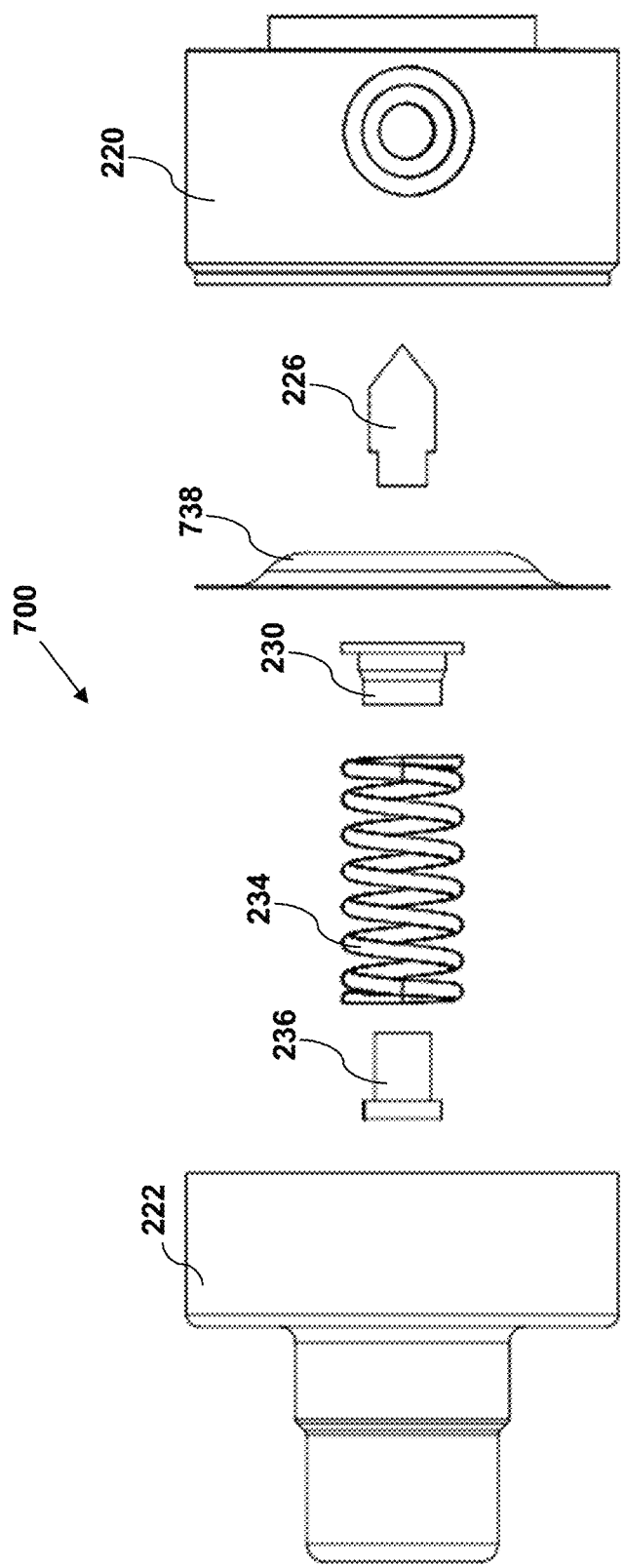
FIG. 7B is an exploded view of the embodiment of FIG. 7A.
Figure 7D:
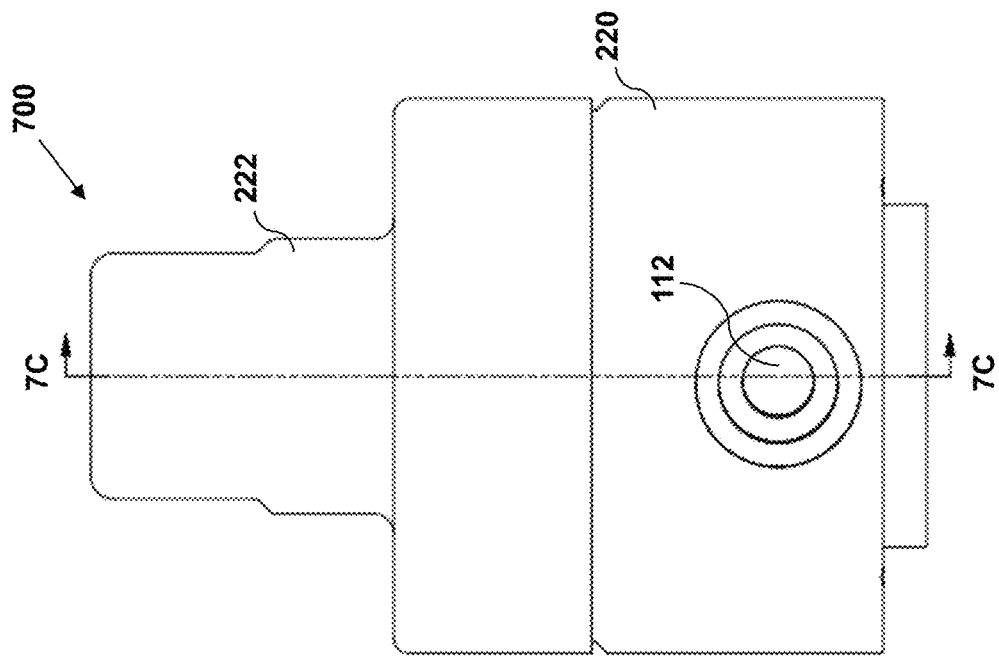
FIG. 7D is a side view of the embodiment of FIG. 7A, showing the section location of FIG. 7C.
Figure 7C:
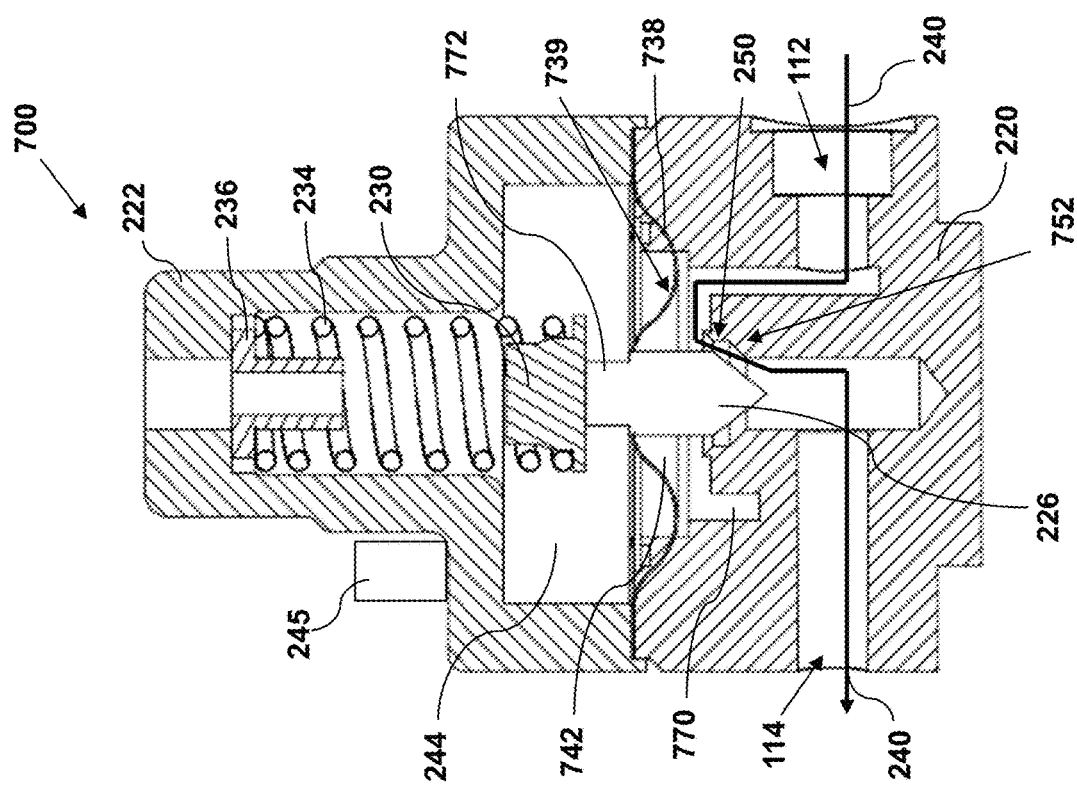
FIG. 7C is a section view of the embodiment of FIG. 7A.

In some embodiments, such as the embodiment of a fluid flow and pressure stabilization device 700 illustrated in FIG. 7C, the second deformable member can be eliminated, with the outflow control button being coupled to the single deformable member 738 instead of a second separate deformable member. In such an embodiment, there is no second fluid chamber, so the connection between the first and second fluid chambers is also eliminated.

Fluid flow and pressure stabilization devices as disclosed herein can be used in fluid piping systems as one component that absorbs pulses in fluid flow and also helps to maintain consistent or linear fluid pressures and/or flow rates. Fluid piping systems may be affected by fluid pulsations, mechanical vibrations, water hammer, and residual "noise" in the fluid generated by multiple transient waves within the fluid as it moves through the system. Devices disclosed herein can protect the fluid piping system components by absorbing this energy and providing a smoother flow of fluid into the system. Further, a variable flow valve included in some of the embodiments disclosed herein can provide constant pressure (and/or more consistent pressure) in the system for all components upstream to the pump discharge (e.g., any components between the outlet 110 of the metering pump 102 and a variable flow valve of the flow and pressure stabilization device 100 of FIG. 1). This ensures that the pump check valves close properly and that all other affected components can be accurately calibrated and operating per system requirements.

In some embodiments, a variable flow valve comprises a flow control button, plunger, needle, and/or the like comprising an outer profile shaped to cooperate with a fluid port such that an effective fluid passage size through the fluid port is changed based on a relative position of the flow control button with respect to the fluid port. In some embodiments, the flow control button is coupled to a diaphragm, and the relative position of the flow control button with respect to the fluid port changes based at least partially on a level of fluid pressure applied to the diaphragm. In some embodiments, the diaphragm is also used as a pulsation dampener. In some embodiments, a separate diaphragm is used as a pulsation dampener.

The various valves used in embodiments disclosed herein can utilize a preload or set point that calibrates the valve to at least partially define a relationship between fluid pressure on the valve's diaphragm and a position of the valve (e.g., open, closed, or somewhere in between). Such a preload can be set by, for example, using a preload spring of a certain length and/or spring rate, compressing or tensioning the preload spring by a certain amount, adjusting a pressure in a gas chamber, and/or the like. The set point for the adjustment is desirably calibrated so that the valve does not close completely (which would cut off flow to the system), but will remain open to allow the process fluid to move from point to point. The opening and closing action of the valve can also produce additional transient pressure waves (pressure spikes or "water hammer") in the fluid, which can lead to operational issues with downstream equipment, if the transient pressure waves are significant enough. Embodiments that include a variable flow restrictor as disclosed herein (e.g., an outflow control button or the like) can reduce or eliminate such pressure waves by enabling a smoother transition between open and closed positions of the valve.

Various embodiments disclosed herein can include a deformable separator (e.g., diaphragm, bladder, bellows, membrane, and/or the like) separating a fluid chamber from a gas chamber charged with gas (e.g., air, nitrogen, and/or the like) to cushion against the pulse of fluid entering the fluid chamber. The gas charge can be set to be automatic based on system pressure fluctuations, manually adjustable or constant. If constant, the gas chamber is charged to a set pressure that is desirably a fraction of the fluid pressure expected in the piping system. A valve (e.g., the various variable flow valves disclosed herein) pressurizes the components in the line (downstream of the pump) to allow the fluid and gas chambers to absorb pulsations of flow that are in the range of pressure that the gas chamber is charged to. Without the valve to maintain the pressure, then the gas chamber could be rendered less effective with handling pulses of flow, and the downstream flow could still contain pulsations (or greater pulsations than desired).

Embodiments disclosed herein that include pulsation absorbing and pressure control functionality provide a user with more control of the system and more effective operation of the pump piping system. In some embodiments, a flow and pressure stabilization device as disclosed herein comprises a pulsation dampening or absorption section (e.g., a bladder separating gas and fluid chambers) and a pressure control section (e.g., a variable flow valve). The device is connected to a fluid piping system, where the fluid enters the pulsation dampening section, then passes to the pressure control section, then exits to the downstream piping system. The dampening section absorbs the energy from the pulsations generated by operation of the pump(s), valve(s) and/or other component(s) that can generate a transient wave, water hammer, or pulse in the piping. The pressure control section provides resistance against the dampening section so that fluid can be moved in uniform manner through the system. The result is a more linear instantaneous flow that is uniform enough to allow for downstream devices such as flow meters and pressure relief valves to operate more safely and effectively. Although this embodiment is described as having separate pulsation dampening and pressure control sections, some embodiments, as described below, combine the pulsation dampening and pressure control functions into a single section or assembly.

As one application example, in chemical dosing systems, the metering pump used typically has a high pulsation on each stroke of the pump. By reducing this pulse as close to the source as possible, the downstream equipment will see a more precise, even flow of the fluid. Improving the accuracy of dosing a chemical into a process stream allows the chemical to be more effective by being more evenly distributed, and may result in less waste of chemicals. One reason for this is that, when pulsations are present in a chemical dosing fluid flow, a higher dose or concentration than desired may be introduced into the system at the peak of a pulse, and a lower dose or concentration than desired may be introduced into the system at a valley in the pulse. The more the flow can be stabilized, (e.g., by reducing these peaks and valleys), the more constant the chemical dose or concentration can be. The flow meters can operate more easily, allowing for safer and more effective addition of chemicals to a process. Further, the pressure relief valves can operate more effectively with less chance of relieving pressure to atmosphere or a collection point. These areas can be expensive to maintain or fix if there are fluctuations in the flow that are beyond the capabilities of the devices.

In some embodiments, the shape of the device is cylindrical, and can be mounted in any direction. In other embodiments, the shape of the device can be any other shape, as long as the functions described herein can be achieved. The connection piping can be achieved by typical connectors used in fluid piping systems, for example, pipe threads, unions, flanges, and/or the like.

Various embodiments disclosed herein incorporate features that enable the device to reduce, absorb, and/or dampen pulsations in fluid flow. Various embodiments can perform such pulsation dampening functions in the various ways. Several of the embodiments described below, with reference to the figures, dampen pulsations by using a deformable separator (e.g., diaphragm, bladder, bellows, membrane, and/or the like) that separates a fluid chamber from a gas chamber. The gas chamber is charged to a certain pressure, either a set pressure or a variable pressure, and pulsations are dampened by allowing the deformable member to deform and rebound in response to pulsations, dynamically changing the relative volumes of the gas chamber and fluid chamber. It should be noted that the terms diaphragm, bellows, bladder, and membrane, when used herein in reference to a pulsation dampening function, are used interchangeably to refer to an at least partially deformable member or separator, (e.g., comprising a rubber, thermoplastic material, elastically flexible metal, and/or the like), that can be used to reduce, absorb, and/or dampen pulsations in fluid flow. Although various embodiments disclosed herein are described with reference to dampening pulsations using a deformable member and gas chamber type system, other techniques for pulsation dampening may be used with the techniques disclosed herein. For example, piston style pulsation dampening may be incorporated into any of the embodiments disclosed herein and any other embodiments that utilize one or more of the techniques disclosed herein.

Further, various embodiments disclosed herein include a valve comprising a flow restrictor that fits at least partially through a fluid port and is translatable with respect to the fluid port to cause variance of a cross-sectional flow area between the flow restrictor and fluid port. Such a flow restrictor may be referred to herein as, for example, a plunger, button, bullet, needle, pin, protruding member, and/or the like, with such terms being used interchangeably. In some embodiments, such a flow restrictor can be designed in various ways to produce varying cross-sectional flow area as the flow restrictor translates with respect to the fluid port. For example, the flow restrictor may in some embodiments comprise an outer profile or surface that comprises one or more of a taper, rounded portion, flat, slot, groove, radiused area, hole or orifice that leads to a fluid flow passage, stepped area, chamfer, and/or the like. Further, although various embodiments described herein describe the flow restrictor as being coupled to a diaphragm, the same or similar techniques may be used in other types of mechanisms or valves for controlling pressure and/or flow. For example, such a flow restrictor may be coupled to a piston that translates with respect to the fluid port instead of a diaphragm that flexes or otherwise moves with respect to the fluid port.

Flow and Pressure Stabilization Device Embodiment

Figure 2F:
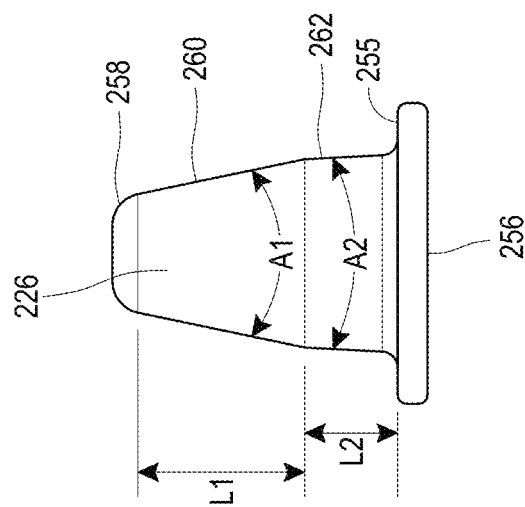
FIGS. 2E and 2F illustrate an outflow control button of the flow and pressure stabilization device of FIG. 2A.
Figure 2E:
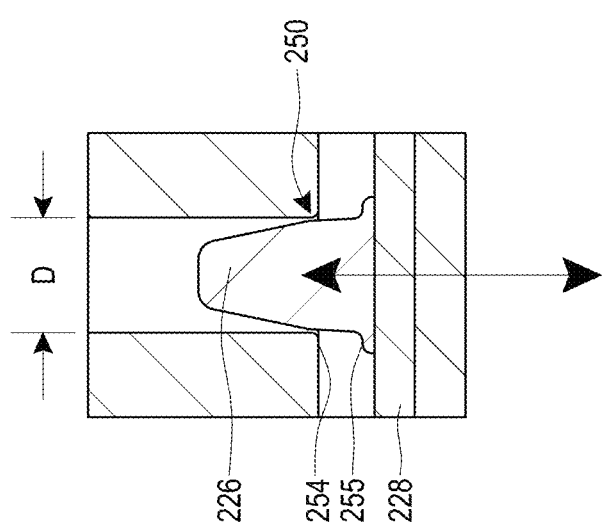
Figure 2I:
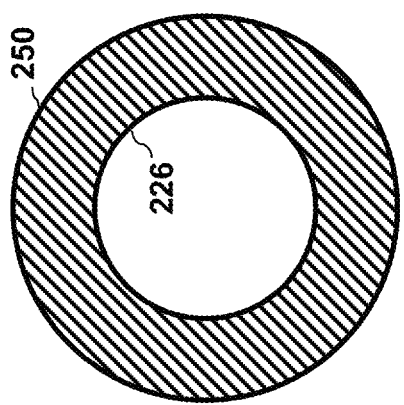
FIGS. 2G-2I illustrate changes in a port opening area based on movement of the outflow control button of the flow and pressure stabilization device of FIG. 2A.
Figure 2H:
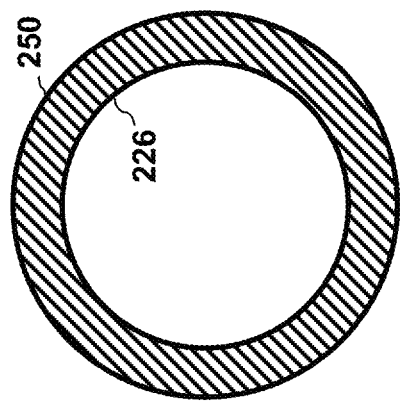
Figure 2G:
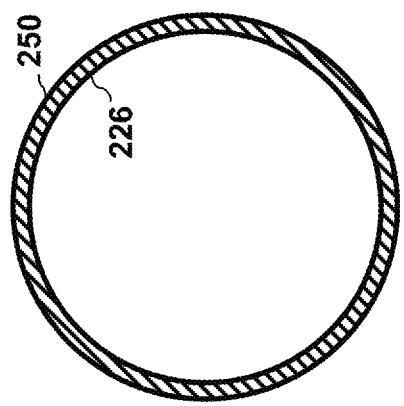
Figure 2K:
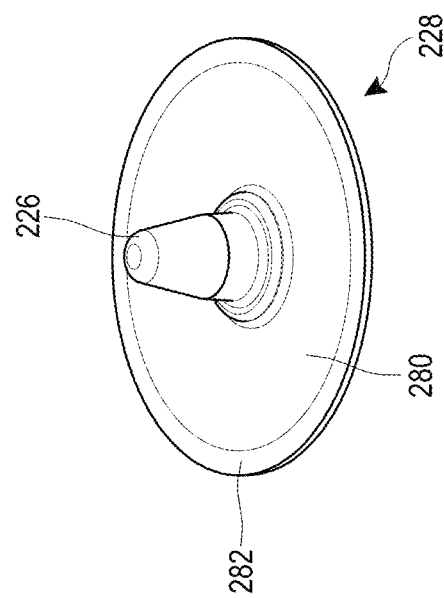
FIGS. 2J and 2K illustrate an outflow control button and diaphragm assembly of the flow and pressure stabilization device of FIG. 2A.
Figure 2J:
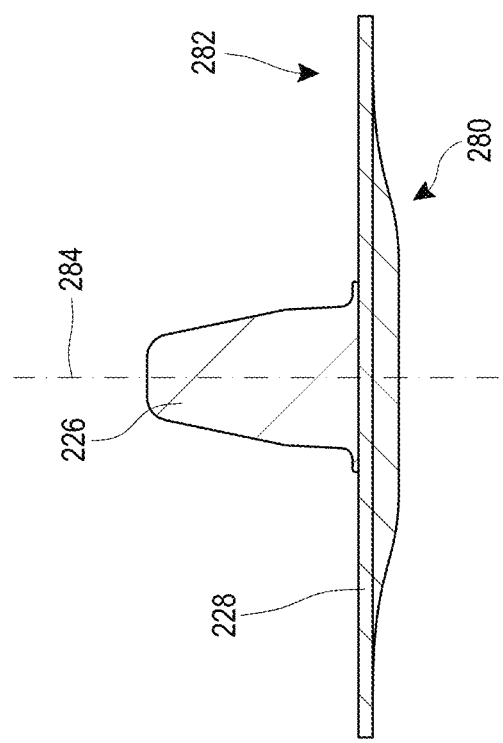

FIGS. 2A-2K illustrate one embodiment of a flow and pressure stabilization device 200. FIG. 2A is an assembled view, FIG. 2B is an exploded view, and FIGS. 2C and 2D are cross-sectional views of the flow and pressure stabilization device 200. FIGS. 2E and 2F are detail views showing details of an outflow control button 226. FIGS. 2G-2I illustrate changes in an opening area with movement of the outflow control button 226. FIGS. 2J and 2K illustrate the outflow control button 226 coupled to a diaphragm 228. With reference to FIGS. 2C and 2D, the housing comprises a top body 222, a middle body 220, and a lower body 224, with the middle body 220 comprising a fluid inlet 112 and a fluid outlet 114 (although other arrangements are possible). In this embodiment, the top body 222 is attached to the middle body 220 via a threaded connection. The top body 222 and middle body 220 when assembled together capture a sealing portion or outer peripheral edge of a deformable separator 238, thus separating an inner chamber created by the top body 222 and middle body 220 into an upper or gas chamber 244 and a lower or fluid chamber 242.

In this embodiment, the bottom body 224 is also coupled to the middle body 220 via a threaded joint. Similar to the top body 222 and middle body 220 junction, when the bottom body 224 and middle body 220 are coupled together, a diaphragm seat 287 seals against an outer portion, sealing portion, or bead portion 282 (see FIG. 2J) of a deformable member or diaphragm 228 that separates a fluid chamber 248 above the diaphragm 228 from an area below the diaphragm 228. In this embodiment, an o-ring 229 is positioned between the bottom body 224 and the sealing portion 282 of the diaphragm 228, to aid in generating a liquid and/or airtight seal. In some embodiments, other techniques may be used to create a liquid and/or airtight seal. For example, the o-ring 229 may be positioned between the sealing portion 282 of the diaphragm 228 and the middle body 220. As another example, instead of the sealing portion 282 comprising a substantially flat upper and lower surface, the sealing portion 282 may comprise one or more annular protrusions, beads, and/or the like protruding from the top and/or bottom surface that are configured to seal against a flat and/or grooved surface of the middle body 220 and/or bottom body 224. With reference to FIG. 2J, the diaphragm 228 desirably comprises an outer sealing portion 282 and a deformable central region 280. The central region 280 is configured to sense upstream and/or downstream pressure (e.g., to deform in response to a fluid pressure on one side of the diaphragm working against the elasticity of the diaphragm and/or a spring load and/or gas pressure on an opposite side of the diaphragm). In this embodiment, the diaphragm 228 comprises an outflow control button 226 coupled to the deformable central region 280, with at least a portion of the deformable region 280 extending laterally beyond the lateral outer edge of the base of the outflow control button 226. The outflow control button 226 may be permanently or removably coupled to the diaphragm 228 in various ways, such as adhered with an adhesive, attached using one or more fasteners, insert molded, and/or the like. In some embodiments, the deformable central region 280 of the diaphragm 228 comprises a substantially flat disc shape in a relaxed state. In some embodiments, however, the deformable central region 280 may comprise relaxed state shape that is not substantially flat, such as a design that includes one or more ribs, bellows, an accordion-type design, and/or the like.

The outflow control button 226 (e.g., plunger, needle, bullet, protruding member, and/or the like) is positioned through a fluid port 250 and configured to at least partially regulate fluid flow through the fluid port 250 by translating with respect to the fluid port 250. The combination of the diaphragm 228, outflow control button 226, and fluid port 250 forms a variable flow valve 252. In this embodiment, the diaphragm 228 comprises a substantially flat outer sealing portion 282 defining a plane that is perpendicular to a longitudinal axis 284 of the housing or middle body 220. The outflow control button 226 protrudes from the diaphragm 228 in a direction wherein a longitudinal axis of the outflow control button 226 is in a parallel and/or coaxial alignment with the longitudinal axis of the housing or middle body 220 (and thus perpendicular to the plane of the diaphragm 228).

In operation, fluid desirably follows flow path 240. As the flow enters the device through the inlet 112 of the middle body 220, it flows into fluid chamber 242, which is bounded by an internal cavity of the middle body 220 and deformable separator 238 (e.g., diaphragm, bladder, bellows, membrane, and/or the like). The deformable separator 238 separates the fluid chamber 242 from a gas chamber 244 that is desirably charged with gas (such air, nitrogen, and/or the like). The gas chamber 244 is bounded by an internal cavity of the top body 222 and the deformable separator 238. The gas pressure is set through a fill valve 245, and desirably the pressure is set to a level that minimizes pulsations in the fluid passing through the device. Gas pressure charge is desirably set to a value less than the system pressure, which will allow the device to dampen pulsations effectively.

The flow 240 then passes through passage 246 (shown in FIG. 2D), which connects the upper fluid chamber 242 to lower fluid chamber 248. The flow then contacts the diaphragm 228 and/or control button 226, which are desirably biased toward a closed orientation with respect to outflow port 250 (but can move away from the closed orientation as a result of pressure in the fluid chamber 248 caused by fluid in the fluid flow 240). The diaphragm 228 is desirably held in place between the middle body 220 and the lower body 224, and the tension on the diaphragm is desirably adjusted via the spring tension cap or adjustment cap 236, the spring 234 and the spring base 230 (which protects the diaphragm from direct contact with the spring). The tension adjustments are set to the system requirements, and help to provide a generally constant pressure to the upstream side of the fluid flow, which allows the other deformable member 238 to operate more effectively in absorbing pulsations and the like. The fluid then exits the device through the outlet 114. As shown in FIGS. 2B and 2C, the flow and pressure stabilization device 200 may further comprise a cover, shield, and/or anti-tamper component 237 coupled to the bottom body 224 to block access to the adjustment cap 236. This may be desirable in some embodiments, for example, to prevent the adjustment cap 236 from being exposed to the elements and/or to prevent or discourage tampering with or adjustment of the adjustment cap 236 after the adjustment cap 236 has been set to the desired position.

Desirably, the components of the flow and pressure stabilization device 200 are constructed from metal, plastic, rubber, and/or other materials adequate to perform the intended functions. The components of this and other devices disclosed herein can be held together with separate fasteners, clamp bands, welded, cast, threaded together and/or the like. Further, any references herein to directions, such as upper, middle, and lower, are provided with reference to the orientations of the drawings to aid in understanding of the drawings and description. These references to directions are not intended to limit the device to being operated in only such an orientation. For example, various embodiments disclosed herein can be installed in any orientation and still perform their intended function.

A flow and pressure stabilization device, such as the flow and pressure stabilization device 200 or other embodiments disclosed herein, can desirably be used with a positive displacement pump to dampen pressure pulsations generated by the displacement of the fluid and the opening and closing of pump inlet and discharge check valves. The use of a variable flow rate valve that helps to maintain upstream pressure (e.g., the variable flow rate valve 252 that comprises the deformable member 228, outflow control button 226, and port 250) can improve the effectiveness of pulsation dampening, especially in low pump head pressure applications. The gas charge pressure in gas chamber 244 should desirably be a fraction of the fluid pressure (typically 80%, but could be other percentages) and if the fluid pressure is too low, the resulting gas charge pressure may be too low to be effective. Further, in positive displacement metering pump applications, a variable flow valve that helps to maintain upstream pressure can also help to close pump check valves and maintain a more constant pressure on hoses, tube, and diaphragms for more uniform deformation—improving dosing accuracy.

Figure 6A:
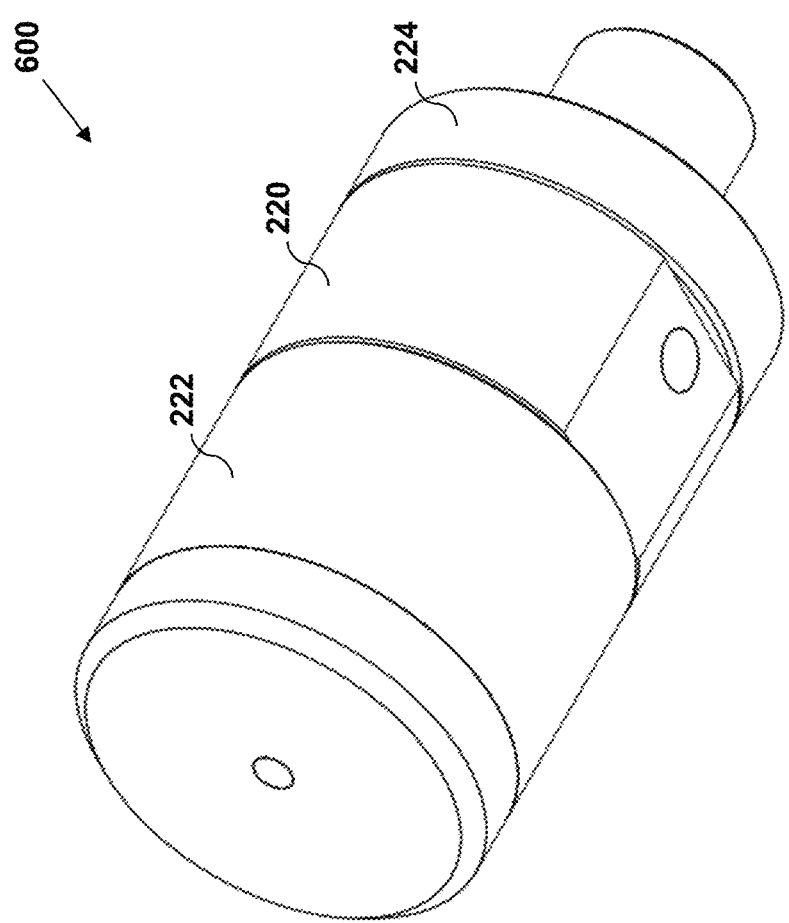
FIG. 6A is an isometric view of another embodiment of a flow and pressure stabilization device.
Figure 6B:
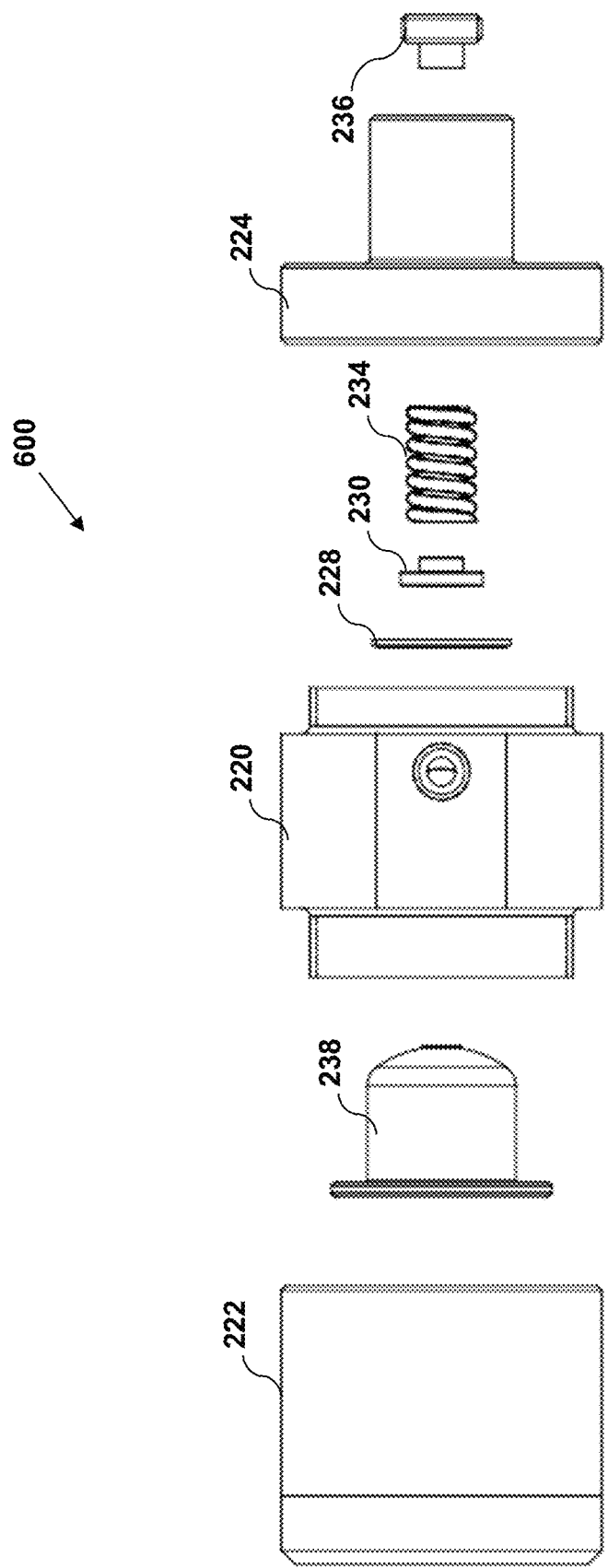
FIG. 6B is an exploded view of the embodiment of FIG. 6A.

One advantage of the design illustrated in FIGS. 2A-2K, and other embodiments disclosed herein (such as, but not limited to, the embodiment illustrated in FIG. 6C), is that the porting geometry forces the fluid to pass into the upper chamber 242, and the fluid cannot exit the upper chamber 242 (or lower chamber 248) through the variable flow valve 252 (or valve 652) until the pressure in the upper chamber becomes large enough to displace the diaphragm 228 of the valve 252. This allows more of the pressure pulse to be dampened. This is an advantage over an "appendage" style dampener with a single port to allow fluid to enter and exit the unit, which can allow some pulsations to pass the unit entirely.

Another advantage of the design illustrated in FIGS. 2A-2K, and other embodiments disclosed herein (such as, but not limited to, the embodiment illustrated in FIG. 6C), is that the integrated nature of the unit allows the distance between the upper fluid chamber 242 and the valve porting or lower fluid chamber 248 to be relatively short, improving pulsation dampening over existing systems. One reason for this is that many pulsations are transient and high speed/very short duration. If the upper and lower fluid chambers 242, 248 were separated by a distance of piping, the pulsation pressure could be high enough to open the valve 252 (or valve 652) and allow the pulsation to "escape" before the upper deformable member 238 can respond (e.g., by deforming to absorb the pulse). In addition, as mentioned above, it is easier for a pulsation to go past an "appendage" style dampener (especially high speed/frequency pulsations). In the embodiments illustrated in FIGS. 2A-2K and 6A-6E, the distance between the upper fluid chamber 242 and valve porting or lower fluid chamber 248 is defined by the length of the fluid passage 246. Due to the integrated nature of such a design, this direct path from the upper chamber 242 to the valve porting or lower chamber 248 can be relatively short. In some embodiments, it can be desirable for the fluid passage 246 to have a length within a range of 1 inch to 3 inches. In some embodiments, it can be desirable to for the fluid passage 246 to have a length within a range of 1 inch to 2 inches. In some embodiments, it can be desirable for the fluid passage 246 to be no longer than 1 inch, 2 inches, 3 inches, or 4 inches. In some embodiments, it can be desirable for the length of the fluid passage 246 to be less than, or no greater than, an outer diameter of the valve diaphragm 228. In some embodiments, it can be desirable for the length of the fluid passage 246 to be less than, or no greater than, an outer diameter of the housing through which the dampener valve feed line passes (e.g., middle body 220). In some embodiments, it can be desirable for the length of the fluid passage 246 to be less than, or no greater than, a diameter of the upper fluid chamber 242. In some embodiments it can be desirable for the length of the fluid passage 246 to be less than, or no greater than, 1.5, 2.0, or 2.5 times a diameter of the upper fluid chamber 242.

Additional advantages of the design illustrated in FIGS. 2A-2K, and other embodiments disclosed herein, are that (1) the integrated nature of the unit allows the upper fluid chamber volume, valve responsiveness, valve flow (Cv), and porting to be optimized, (2) the device can be more compact and weigh less than other systems, (3) the life of the valve diaphragm may be extended, and (4) fewer leak points/ piping junctions are used than other systems.

With further reference to FIGS. 2A-2K, as discussed above, the flow and pressure stabilization device 200 comprises a variable flow valve 252 that comprises an outflow control button 226 (e.g., plunger, needle, bullet, protruding member, and/or the like) positioned through a fluid port 250 and configured to at least partially regulate fluid flow through the fluid port 250 by translating with respect to the fluid port 250. The operation of the outflow control button 226 can be similar to the operation of the plunger or button 226 shown in FIG. 7C and described below.

With further reference to FIG. 2C, as the flow 240 enters the device through the inlet 112 of the middle body 220, it enters the upper fluid chamber 242 and contacts the bladder 238. The other side of the diaphragm or bladder 238 is a gas chamber 244 that is charged with gas (typically air or nitrogen) in the top body 222. The gas pressure is set through a fill valve 245 so that the pulsations from the pumped fluid can be absorbed and minimized. Gas pressure charge is desirably set to a value less than the system pressure, which will allow the device to dampen pulsations effectively.

The flow is then directed toward the diaphragm 228 of the variable flow valve 252, which is held fixed on the outer diameter to the middle body 220 and bottom body 224 and is connected in its center to the outflow control button 226 on the fluid side. The button 226 and diaphragm 228 move up and down absorbing the flow pulses as the system pressure changes, and the geometry of the button relative to the opening or fluid port 250 regulates the flow. The plunger desirably only moves up and down in the outlet port 250 to regulate the flow exiting the device based on system pressure. The spring adjustment is accomplished by moving the adjustment cap 236 up or down depending on the sensitivity required by the system. The spring 234 is held between the adjustment cap 236 and spring base 230, which then applies pressure to the center of the diaphragm 228.

The gas charge adjustments are set to the system requirements, and provide a desirable pressure to the bladder 238, while the spring adjustments provide varying pressure to the diaphragm 228 and button 226, allowing the device to work effectively as the system flow rates change. The fluid then exits the device through the outlet 114.

In some embodiments, the upper or top body 222 can be referred to as a dampener body, and the lower or bottom body 224 can be referred to as a valve body, since, among other things, the deformable member 238 adjacent the upper body 222 can perform dampening functions, and the deformable member 228 adjacent the lower body 224 can perform valve functions.

Outflow Control Button

With reference to FIGS. 2E and 2F, the button 226 and fluid port 250 are configured to operate cooperatively to vary an effective opening size (e.g., a size of the area through which fluid can flow) of the fluid port 250 based on translation of the button 226 along a central or longitudinal axis of the fluid port 250. FIG. 2E shows the button 226 and diaphragm 228 in a partially opened position, meaning at least some fluid can flow through a clearance between the button 226 and fluid port 250. In some embodiments, the assembly can be configured to have a fully closed position, such as wherein a base or end face 254 of the fluid port 250 (e.g., an annular shaped opening) is closed off by an annular laterally extending base portion 255 of the control button 226 being abutted thereagainst, thus allowing no fluid flow through the fluid port 250. In some embodiments, the diaphragm 228 may be configured to contact the end face 254 of the fluid port 250, instead of an annular laterally extending base portion 255 of the control button 226. In some embodiments, a fully closed position can comprise outer surface 262 of the button 226 (shown in FIG. 2F) being in contact with an inner surface of the port 250. In some embodiments, the assembly can be configured to not have a fully closed position, thus always having at least some clearance between the button 226 and port 250. In an embodiment that comprises a fully closed position, as fluid pressure increases on the diaphragm 228, the diaphragm 228 and button 226 will be caused to translate away from the end face 254 of the fluid port 250, thus opening the fluid port 250 for fluid to pass therethrough.

The effective opening size of the fluid port 250 (e.g., the cross-sectional area available for fluid to pass therethrough) will be controlled by the diameter D of the fluid port 250 and the outer profile of the button 226. In a design as shown in FIGS. 2E and 2F, where the outer profile of the button 226 continuously decreases in width from base 256 to tip 258, the effective opening size of the fluid port 250 will be controlled by the portion of the button 226 that is presently at or adjacent the base or end face 254 of the fluid port 250. Some embodiments of buttons 226, however, may have different outer profile shapes (e.g., a reverse taper, a non-tapered section, and/or the like) that cause the effective opening size of the fluid port 250 to be limited at an area not at or adjacent the base or end face 254 of the fluid port 250.

FIGS. 2G-2I illustrate an example of how the effective opening size of the fluid port 250 can be changed when the outflow control button 226 translates with respect to the port 250. In each of these figures, a simplified (and not necessarily to scale) view of the assembly as viewed along the longitudinal axis at the end face 254 is shown by an outer circle that represents the inner diameter of the port 250 and an inner circle that represents the outer diameter of the outflow control button 226 at the opening or interface 254 into the port 250. The hatched area between these two circles indicates the effective cross-sectional area of the port 250. FIG. 2G illustrates an example of the port in an almost-closed position, such as is shown in FIG. 2E. FIG. 2H illustrates an example where the outflow control button 226 has been caused to translate away from the end face 254 of the port 250, such as, as a result of fluid pressure on the diaphragm 228. It can be seen that, as compared to FIG. 2G, the cross-sectional area of the port 250 has been increased. FIG. 2I illustrates an example where the outflow control button 226 has been caused to translate even further away from the end face 254 of the port 250. It can be seen that, as compared to FIG. 2H, the cross-sectional area of the port 250 has been increased further. Such a design can be desirable, because, among other things, the flow through the flow and pressure stabilization device can be more consistent, because the effective opening size of the port 250 can respond to the pressure in the device, making the effective opening size larger or smaller on demand.

Further, the tapered profile of the outflow control button 226 can have other benefits in addition to varying the effective opening size of the port 250. For example, the tapered shape can help to reduce turbulence in the flow through the port 250 and out of the device through outlet 114, thus further stabilizing the fluid flow in the system.

Returning to FIGS. 2E and 2F, the dimensions and/or shapes of the fluid port 250 and profile of the button 226 define the relationship between translation of the button 226 and effective opening size of the fluid port 250. For example, with reference to FIG. 2F, the current embodiment of a button 226 comprises a rounded tip 258, a first tapered section 260, and a second tapered section 262. In this embodiment, the taper of the first tapered section 260 is defined by angle A1 and length L1, and the taper of the second tapered section 262 is defined by angle A2 and length L2. These dimensions can be varied to tune the button 226 to a particular application. In the present embodiment, however, the first tapered section 260 comprises a length L1 of approximately 0.3 inches, and a taper angle A1 of approximately 24 degrees. The diameter of the first tapered section 260 starts at approximately 0.294 inches and ends at approximately 0.168 inches. The second tapered section 262 comprises a length L2 of approximately 0.2 inches, and a taper angle A2 of approximately 6 degrees. The diameter of the second tapered section 262 starts at approximately 0.313 inches and ends at approximately 0.294 inches (at the junction between the first and second tapered sections 260, 262). In this embodiment, the button 226 is configured to fit into fluid port 250 having a diameter D of approximately 0.313 inches. One of skill in the art will recognize that this is merely one example, and other embodiments may use different dimensions to tune the device to different operating parameters. For example, in some embodiments, the taper angles A1 and A2 may be within a range of 0 to 45 degrees. Further, the lengths and/or diameters may be different, a different number of tapered sections may be used, different methods of changing the flow area may be used (e.g., flats, slots, rounded areas, ports, holes, orifices, fluid passages, steps, and/or the like), more than one flow restrictor may be used, and/or the like.

With continued reference to FIGS. 2E and 2F, as the button 226 translates away from the end face 254 of the fluid port 250, the second tapered section 262 will be the primary controlling factor for the effective size of the fluid port opening 250. As the button 226 continues to translate further away from the end face 254, and the second tapered section 262 passes the end face 254 (e.g., the button 226 translates a distance greater than L2), the first tapered section 260 will primarily define the effective opening size of the fluid port 250. In this embodiment, angle A2 is smaller than angle A1, and thus translation of the button 226 when the second tapered section 262 is controlling will result in less adjustment to the effective opening size of the fluid port 250 than the same amount of translation of the button 226 when the first tapered section 260 is controlling. One of skill in the art will recognize that, although this description is given primarily in terms of the tapered section being immediately adjacent to the base or end face 254 as being controlling, the remainder of the profile of the bullet or button 226 can also have some effect on fluid flow, particularly in instances of relatively fast flow and/or relatively high frequency pulses or changes in fluid flow.

Desirably, the components of the flow and pressure stabilization device 200 are constructed from metal, plastic, rubber, and/or other materials adequate to perform the intended functions. The components of the device can be held together with separate fasteners, clamp bands, welded, cast, threaded together and/or the like.

In some embodiments, the techniques disclosed herein relating to flow restrictors (for example, utilizing an outflow control button coupled to a diaphragm to control flow through a fluid port) may be utilized in a standalone valve unit that does not include an additional deformable member (such as a bladder) to perform separate pulsation dampening functionality. For example, one embodiment may be similar to the device 200 of FIGS. 2A-2K, but be configured to not include the top body 222 or bladder 238, with corresponding changes to the middle body 220 being made so that the inlet 112 leads directly to the fluid chamber 248 adjacent the diaphragm 228.

Test Results of a Flow and Pressure Stabilization System

The embodiments disclosed herein comprise various features that can provide benefits such as reducing and/or absorbing pulsations in fluid flow, maintaining upstream pressure, and/or increasing linearity of a downstream flow. As one example of such benefits, FIG. 3 illustrates a chart showing test results of an embodiment of a fluid flow and pressure stabilization system as disclosed herein. In this test, a fluid flow and pressure stabilization device similar to the device 200 shown in FIGS. 2A-2D (described above) was tested with a metering pump that comprises an output having significant pulsations. The chart graphs flow rate in cubic inches per second versus time in seconds. With reference to the example system shown in FIG. 1, the measured flow rate would correspond to the flow rate in the piping between outlet 114 and injection point 116.

The chart illustrates testing of three potential methods of smoothing out the flow rate. First, as illustrated by line 301, a diaphragm-type back pressure valve was placed downstream of the pump output (e.g., in place of the device 100 of FIG. 1). As can be seen in the chart, there were relatively large spikes in flow rate in response to pulsations output from the pump. Second, as illustrated by line 302, a diaphragm-type back pressure valve was placed downstream of the pump output (e.g., in place of the device 100 of FIG. 1), and a pulsation dampener was placed between the back pressure valve and the pump output. In this test, the flow rate was substantially smoothed out with respect to the back pressure valve alone, but there were still significant peaks and valleys in the flow rate, as caused by the pulsations in the pump output. Finally, a fluid flow and pressure stabilization device similar to the device 200 illustrated in FIGS. 2A-2D was placed downstream of the metering pump output (e.g., the device 100 of FIG. 1). The results of that configuration are shown by line 303. As can be seen in the chart, the peaks and valleys in the flow rate are almost eliminated, leading to a much more stable or linear flow.

Additional Flow Restrictor Embodiments

As mentioned above, various configurations of flow restrictors (e.g., outflow control buttons, plungers, pins, needles, and/or the like) and fluid ports may be used to tune a device to a particular situation. Flow restrictors may use various features to vary the flow area and/or restriction to fluid flow based on a relative position of the flow restrictor to the fluid port. For example, a flow restrictor may in some embodiments comprise an outer profile or surface that comprises one or more of a taper, rounded portion, flat, slot, groove, radiused area, hole or orifice that leads to a fluid flow passage, stepped area, chamfer, and/or the like.

Figure 4B:
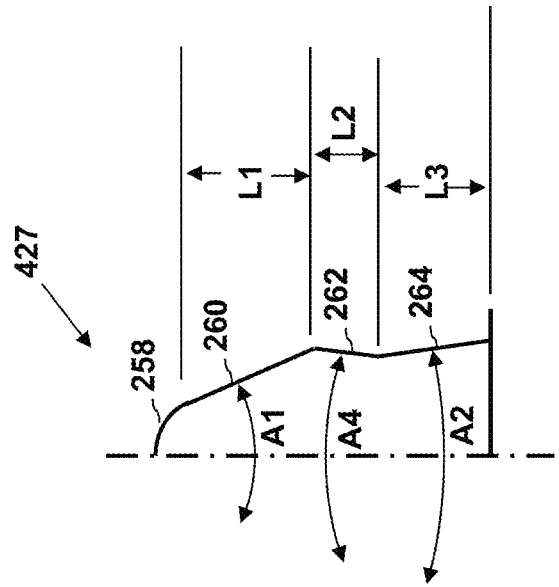
FIG. 4B illustrates another embodiment of an outflow control button.
Figure 4A:
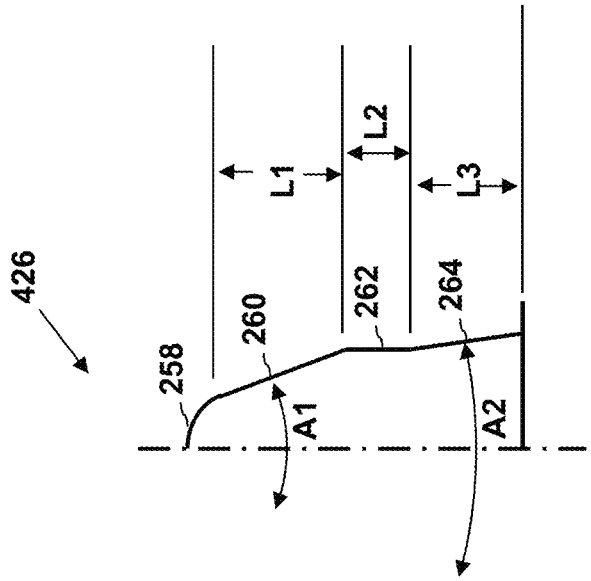
FIG. 4A illustrates another embodiment of an outflow control button.
Figure 5B:
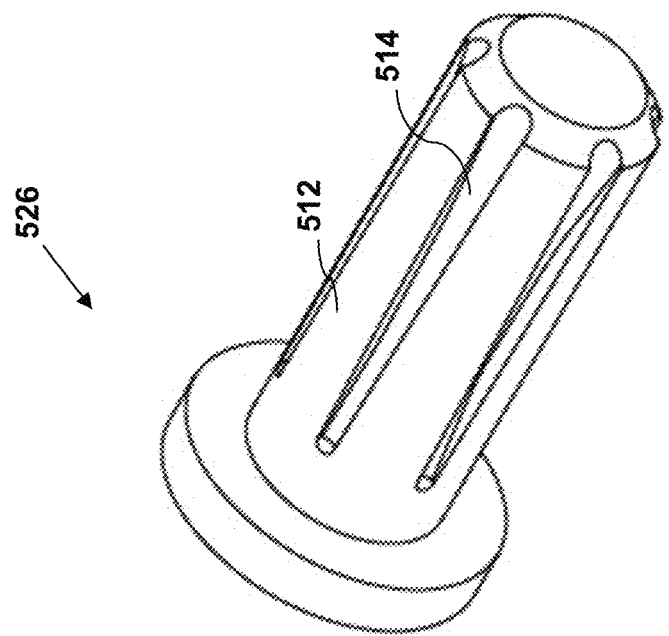
FIGS. 5A-5D illustrate another embodiment of an outflow control button.
Figure 5A:
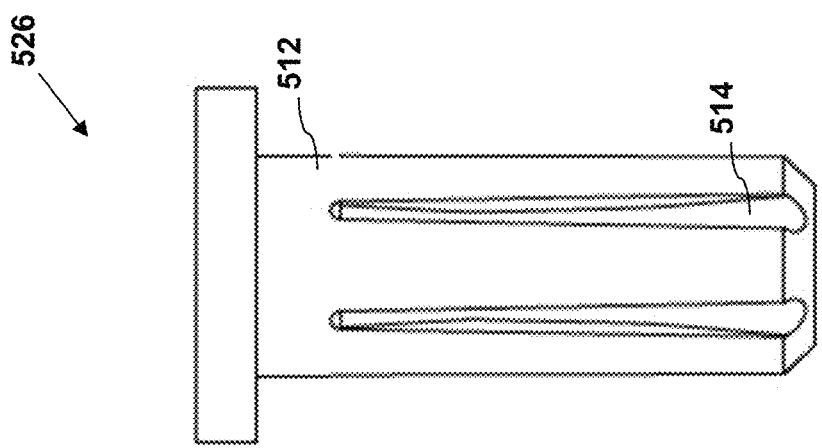
Figure 5D:
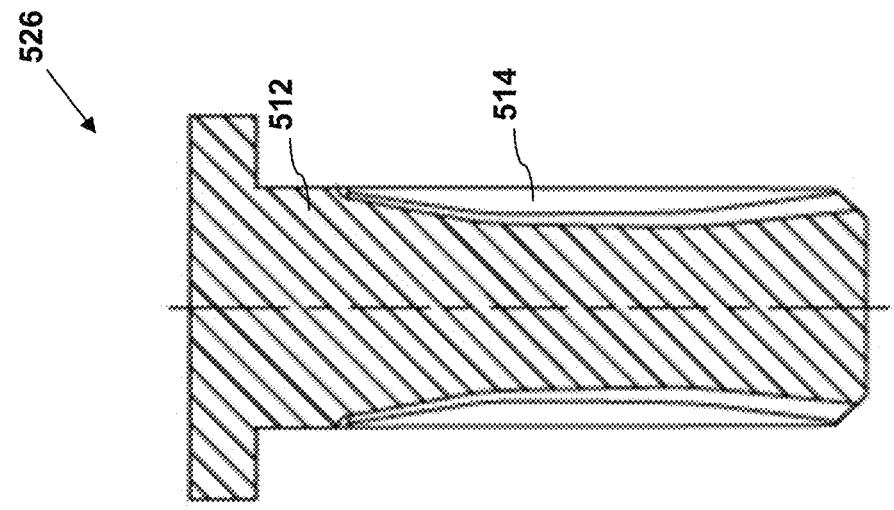
Figure 5C:
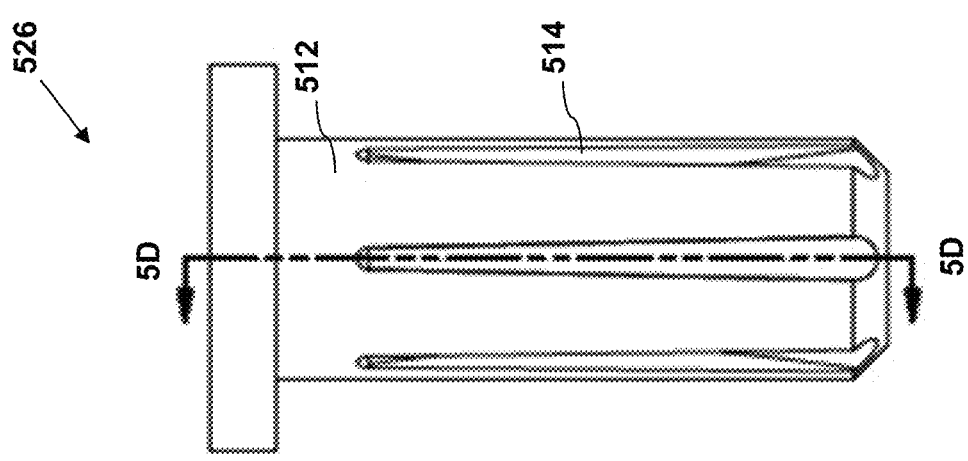

FIGS. 4A and 4B illustrate two additional example embodiments of outflow control buttons 426, 427 (e.g., flow restrictors) that could be used to tune the operation of a device to a particular situation. With reference to FIG. 4A, the outflow control button 426 is similar in design to the outflow control button 226 of FIG. 2F. The outflow control button 426, however, adds a third section that is not tapered. In this embodiment, the outflow control button 426 comprises a rounded tip 258, a first section 260 having taper angle A1 and length L1, a second section 262 having no taper angle and a length L2, and a third section 264 having taper angle A2 and a length L3. Such a design may be desirable, for example, in a situation where it is desirable to have little or no change in the effective flow area of the fluid port in response to a certain amount of increase in pressure on the diaphragm.

With reference to FIG. 4B, the outflow control button 427 is similar to the outflow control button 426 of FIG. 4A. A difference, however, is that the second section 262 comprises a reverse taper having angle A4 instead of a non-tapered section. Such a configuration may be desirable, for example, in a situation where it is desirable to reduce the effective opening size of the fluid port for a particular range of translation of the button 427 and/or to tune the flow of fluid past the button 427.

FIGS. 5A-5D illustrate another embodiment of a flow restrictor 526 (e.g., a flow control button, pin, needle, plunger, and/or the like). Instead of comprising a tapered outer profile, the flow restrictor 526 comprises a shaft 512 of desirably constant outer diameter, and a plurality of slots or grooves 514 passing through the outer surface of the shaft 512. As can be seen in the cross section view of FIG. 5D, the plurality of slots or grooves 514 comprise a curved, tapered, and/or varying shaped base that results in different slot depths along the length of the shaft 512. This can allow the effective flow area to be varied when the flow restrictor 526 translates with respect to a fluid port, and thus allow for more or less flow depending on the pressure of fluid in the line. Such a design can also allow restrictions of flow during high pressure instances. Further, with reference to the side view of FIG. 5C, a transverse width of the slots or grooves 514 can vary along the length of the flow restrictor 526, also contributing to variances in flow area when the flow restrictor 526 translates with respect to a fluid port.

In some embodiments, it can be desirable to have an outermost surface or shaft (for example, shaft 512) of a constant diameter, as opposed to a tapered, stepped, and/or the like outer profile. The constant diameter shaft 512 can help to guide the flow restrictor 526 in the fluid port (e.g., port 250 of FIG. 2E) as the flow restrictor 526 translates back and forth. This can, for example, eliminate or reduce potential cocking and/or undesirable motion in a transverse direction of the flow restrictor with respect to the fluid port.

As mentioned above, the embodiments of flow restrictors described herein and shown in the figures are merely some example embodiments of flow restrictors that could be used with the techniques disclosed herein. Other embodiments of flow restrictors may comprise one or more of stepped shapes, radiused areas, tapered areas, grooves, slots, holes, orifices, fluid passages through the flow restrictor, chamfers, helical shaped grooves, and/or the like. Further, in some embodiments, the shape of the fluid port that the flow restrictor engages may be other than circular or cylindrical. For example, the fluid port may comprise a shape that is tapered, stepped, radiused, curved, irregular, chamfered, and/or the like. Further, in some embodiments, more than one flow restrictor may be used in the same device. For example, two flow restrictors may be used with different fluid ports, with one flow restrictor being tuned to make fine adjustments to the flow and another flow restrictor being tuned to make more coarse adjustments to the flow. Such a configuration may, for example, enable a single device as disclosed herein to operate more effectively across a broader range of operating parameters and/or to more effectively control the flow.

Various other shapes and sizes of outflow control buttons and/or fluid control ports may be used that enable varying the effective fluid port opening size in response to translation of the diaphragm and/or button. Various shapes and sizes may be used for particular situations based on, for example, the expected fluid pressures, flow rates, pulsation frequencies, and/or the like. Further, a plurality of outflow control buttons of different shapes, sizes, and/or configurations may be designed to be interchangeable to work with the same flow and pressure stabilization device, to enable tuning of the flow and pressure stabilization device to a particular set of circumstances. In some embodiments, an outflow control button coupled to a diaphragm, such as the assembly shown in FIG. 2J, may be an interchangeable standalone assembly that can be swapped out in a flow and pressure stabilization device, to relatively easily tune the device to a particular application.

Adjusting the dimensions of the fluid outflow control buttons and/or various other parameters of a device as disclosed herein can be desirable to tune a device to a particular set of conditions. Other features that may be adjusted to tune a device may include, but are not limited to, diaphragm compliance, spring rate and/or preload pressure of the spring or gas that is preloading the diaphragm and/or outflow control button, pulsation dampener diaphragm gas pressure, volumes of various chambers of the device, passage and/or orifice opening sizes, and/or the like. Such tuning can be desirable to enable the back pressure valve and dampener functions to work more effectively together as a system. In some embodiments, it is desirable to tune the system to have as linear flow output as possible. For example, such a flow can desirably comprise a relatively constant flow rate, with removal of any pressure pulses output by the pump.

Additional Flow and Pressure Stabilization Device Embodiment

FIGS. 6A-6E illustrate another embodiment of a flow and pressure stabilization device 600. This embodiment comprises a housing having housed therein components for performing pulsation dampening and controlling fluid pressure. This embodiment is similar to the flow and pressure stabilization device 100, with one difference being that the device 600 does not include an outflow control button attached to the diaphragm 228.

Figure 6E:
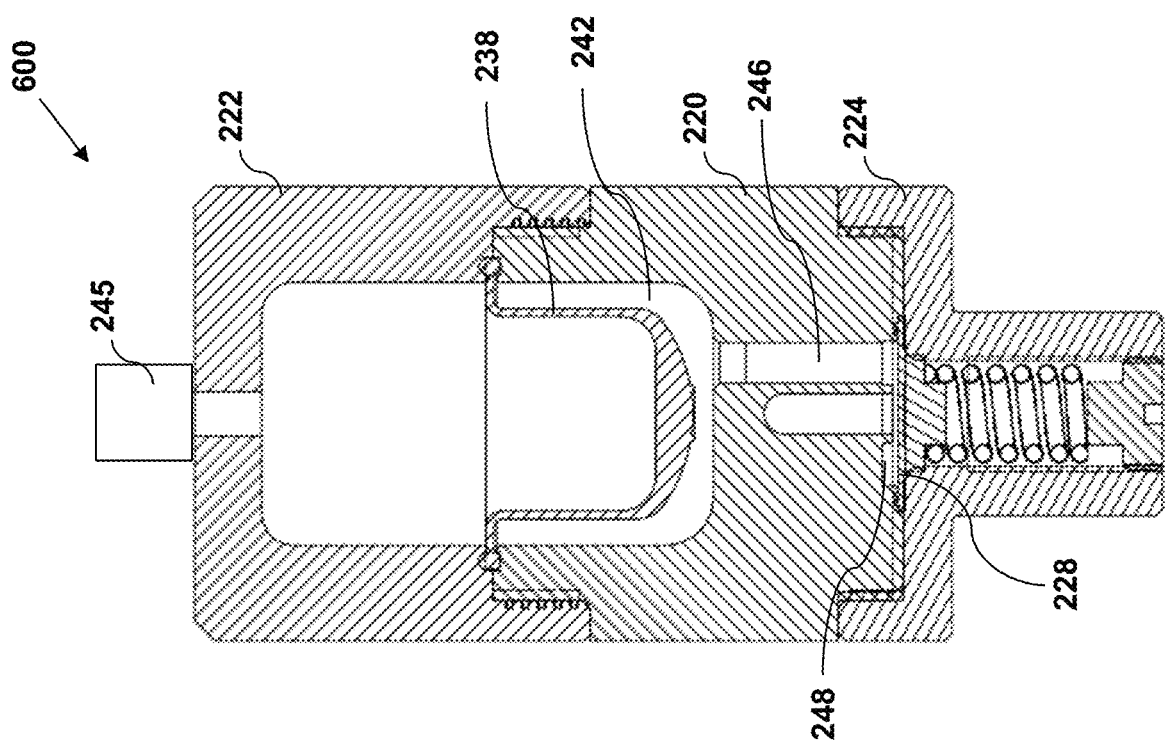
FIG. 6E is another section view of the embodiment of FIG. 6A.

With reference to FIGS. 6C and 6E, the housing comprises a lower body 224, a middle body 220, and an upper body 222 (although other arrangements are possible). In operation, as the flow (illustrated by flow path 240) enters the device through the inlet 112 of the middle body 220, it enters on the upper fluid chamber 242 in the upper body 222. The chamber is separated into two sections by means of a deformable separator 238 (e.g., diaphragm, bladder, bellows, membrane, and/or the like) that is charged with gas (typically air or nitrogen) in the gas chamber 244 side. The gas pressure is set through a fill valve 245 (shown in FIG. 6E) so that the pulsations from the pumped fluid can be absorbed and minimized. Gas pressure charge is desirably set to a value less than the system pressure, which will allow the device to dampen pulsations effectively.

The flow then passes through the fluid passage or line 246 and into the lower fluid chamber 248 and contacts the valve 652, which comprises a diaphragm 228 held against a port 250 until a pressure in the lower fluid chamber 248 is sufficient to open the valve (e.g., to move a portion of the diaphragm 228 away from the port 250). The diaphragm 228 is held in place between the middle body 220 and the lower body 224, and the tension on the diaphragm is adjusted via the spring tension cap 236, the spring 234 and the spring base 230 which protects the diaphragm from the spring and/or provides a more consistent contact area for the diaphragm. The tension adjustments are set to the system requirements, and desirably provide a generally constant pressure to the upstream side of the device 600, which allows the bladder 238 to work more effectively to absorb pulsations. The fluid then exits the device through the outlet 114.

Desirably, the components of the flow and pressure stabilization device 600 are constructed from metal, plastic, rubber, and/or other materials adequate to perform the intended functions. The components of this and other devices disclosed herein can be held together with separate fasteners, clamp bands, welded, cast, threaded together and/or the like.

A flow and pressure stabilization device, such as the flow and pressure stabilization device 600 or other embodiments disclosed herein, can desirably be used with a positive displacement pump to dampen pressure pulsations generated by the displacement of the fluid and the opening and closing of pump inlet and discharge check valves. The use of a valve that helps to maintain upstream pressure (e.g., the valve 652) can improve the effectiveness of pulsation dampening, especially in low pump head pressure applications. The dampener gas charge pressure should desirably be a fraction of the fluid pressure (typically 80%, but could be other percentages) and if the fluid pressure is too low, the resulting dampener charge pressure is too low to be effective. Further, in positive displacement metering pump applications, a valve that helps to maintain upstream pressure can also help to close pump check valves and maintain a more constant pressure on hoses, tube, and diaphragms for more uniform deformation—improving dosing accuracy. In some embodiments, a flow and pressure stabilization device comprises a pulsation dampener and a backpressure valve connected in series within a single housing.

Additional Flow and Pressure Stabilization Device Embodiment

FIGS. 7A-7D illustrate another embodiment of a flow and pressure stabilization device 700. The flow and pressure stabilization device 700 comprises a housing having housed therein components that perform pulsation dampening functions and fluid pressure and/or flow control functions (e.g., help to maintain upstream fluid pressure and/or create more linear downstream pressure). The flow and pressure stabilization device 700 is similar in many respects to the flow and pressure stabilization devices 100, 200, and 600 described above. One difference in the flow and pressure stabilization device 700, however, is that the device comprises a single fluid chamber 742 instead of separate upper and lower fluid chambers connected by a fluid passage. As discussed above, it can be desirable to have a relatively small distance (e.g., the length of fluid passage 246) between the upper fluid chamber that comprises an upper diaphragm or bladder and the lower fluid chamber that comprises a valve or variable flow valve. In the embodiment illustrated in FIG. 7C, the fluid passage 246 has been eliminated, thus minimizing the distance. The flow and pressure control device 700 still comprises a deformable member 738 (e.g., diaphragm, bladder, and/or the like) for absorption of pulses and a variable flow valve 752 for maintaining a more consistent pressure. For example, the deformable member 738 shown in FIG. 7C can perform similar functions to the deformable members 238 and 228 in FIGS. 2C and 6C. Further, the variable flow valve 752 can perform similar functions to the variable flow valve 252 of FIG. 2C.

As further described below, the flow and pressure stabilization device 700 can have more than one configuration, including a configuration that preloads the plunger 226 (e.g., outflow control button, restrictor, bullet, needle, protruding member, and/or the like) with a gas pressure in gas chamber 244, a configuration that preloads the plunger 226 with a pressure from a spring 234, and a configuration that preloads the plunger 226 with both the gas pressure in the gas chamber 244 and the pressure from the spring 234.

With reference to FIG. 7C, the housing comprises a top body 222 and a bottom body 220. As the flow (illustrated by flow path 240) enters the device through the inlet 112 of the bottom body 220, it enters the fluid chamber 742 and contacts the diaphragm, bladder, or deformable member 738. The other side of the diaphragm 738 is a gas chamber 244 that is charged with gas (such as air or nitrogen) in the top body 222. The gas pressure is set through a fill valve 245 so that the pulsations from the pumped fluid can be absorbed and minimized. Gas pressure charge is desirably set to a value less than the system pressure, which will allow the device to dampen pulsations effectively.

The diaphragm 738 is connected in its center to a plunger (e.g., button, needle, protruding member, bullet, pin, flow restrictor, and/or the like) 226 on the fluid side. A deformable area 739 of the diaphragm 738 that is located between the plunger 226 and an outer diameter of the diaphragm 738 (e.g., a rib, bulge, protruding portion, bellow portion, and/or the like) desirably moves up and down absorbing system pulses without moving the plunger 226, unless the system pressure changes. The plunger 226 desirably only moves up and down in the outlet port or fluid port 250 to regulate the flow exiting the device through outlet 114 based on system pressure. In some embodiments, the spring 234 is not included, and thus the gas charge setting will position the diaphragm 738 and plunger 226 during operation to provide the necessary adjustment on the diaphragm to provide back pressure upstream of the device and on the diaphragm. The gas charge adjustments are set to the system requirements, and provide a desirable pressure to the outer, curved part 739 of the diaphragm, which allows the pulsations to be dampened.

In some embodiments, an annulus, annular groove, or recess 770 can be included, and can provide various benefits. For example, when the variable flow valve 752 is open, fluid flows from inlet 112 through the fluid chamber 742 and exits through the fluid port 250 and outlet 114. Fluid will tend to flow directly from the inlet 112 to the side or portion of fluid port 250 that is closest to the inlet 112. To desirably optimize flow and take full advantage of the cross sectional area between fluid port 250 and outflow control button 226, the annulus 770 allows fluid to flow (or more fluid to flow) fully around the periphery of fluid port 250 and enter the port from all sides. This feature can improve valve performance and also reduce or minimize erosion that can occur on the housing due to flowing fluid. This can also improve the pressure distribution of the fluid against the deformable area 739 of the diaphragm 738 to improve dampening effectiveness. The annulus 770 may comprise different depths and/or shapes in various embodiments, and some embodiments may not include such an annulus.

In an embodiment that includes the spring 234, the spring 234 provides a preload to the plunger 226, but the gas in the gas chamber 244 still pressurizes the deformable area 739 of the diaphragm 738 to provide or enhance pulsation dampening. The gas in the gas chamber 244 may in some embodiments also contribute at least partially to the preload force on the plunger 226. As the flow enters the device through the inlet 112 of the bottom body 220, it enters the fluid chamber 742 and contacts the diaphragm 738. The other side of the diaphragm is a gas chamber of trapped air in the top body 222. The diaphragm 738 is connected in its center to a connector 772 on the gas side and a plunger 226 on the fluid side. The connector 772 is attached to the spring base 230, which is guided by a spring 234, which is tensioned via a spring tension cap 236. In some embodiments, the connector 772 is integral to the plunger 226. In some embodiments, the connector 772 is a separate piece from the plunger 226. The tension pressure is set through the spring tension cap 236, so that the pulsations from the pumped fluid can be absorbed and minimized. Tension pressure is desirably set so that it will allow flow through the device to a value less than the system pressure.

The rib 739 between the center section and outer diameter of the diaphragm 738 desirably moves up and down absorbing system pulses without moving the plunger 226, unless the system pressure changes. The plunger 226 desirably only moves up and down in the outlet port 250 to regulate the flow exiting the device through outlet 114 based on system pressure. The tension setting will position the diaphragm 738 and plunger 226 during operation to provide the necessary adjustment on the diaphragm to provide back pressure upstream of the device and on the diaphragm. Accordingly, the gas charge and tension adjustments are set to the system requirements, providing for a desirable pressure to the outer, curved part of the diaphragm 739, which allows the pulsations to be dampened, and allows the plunger 226 to move up and down in the outlet port 250 to regulate the flow exiting the device.

In some embodiments, an annulus, annular groove, or recess 770 can be included, and can provide various benefits. For example, when the variable flow valve 752 is open, fluid flows from inlet 112 through the fluid chamber 742 and exits through the fluid port 250 and outlet 114. Fluid will tend to flow directly from the inlet 112 to the side or portion of fluid port 250 that is closest to the inlet 112. To desirably optimize flow and take full advantage of the cross sectional area between fluid port 250 and outflow control button 226, the annulus 770 allows fluid to flow (or more fluid to flow) fully around the periphery of fluid port 250 and enter the port from all sides. This feature can improve valve performance and also reduce or minimize erosion that can occur on the housing due to flowing fluid. This can also improve the pressure distribution of the fluid against the deformable area 739 of the diaphragm 738 to improve dampening effectiveness. The annulus 770 may comprise different depths and/or shapes in various embodiments, and some embodiments may not include such an annulus.

Desirably, the components of the flow and pressure stabilization device 700 are constructed from metal, plastic, rubber, and/or other materials adequate to perform the intended functions. The components of the device can be held together with separate fasteners, clamp bands, welded, cast, threaded together and/or the like.

Although the flow and pressure stabilization device 700 has been described as having at least two alternative embodiments, one that includes the spring 234 and one that does not include the spring 234, it can be desirable to include the spring 234. One reason it can be desirable to include the spring 234 along with the pressurized gas in chamber 244 is that the pressure required in gas chamber 244 to effectively absorb pulsations using the deformable area 739 of the deformable number 738 may be a different pressure than would be most desirable to control the up and down or translating motion of the outflow control button 226 with respect to the port 250. Further, even in a case where an optimum pressure can be achieved in gas chamber 244 that adequately controls both the deformable area 739 and the translating motion of the outflow control button 226, it may be desirable to have separate adjustability to the pressure or force applied to the deformable area 739 and to outflow control button 226, to accommodate changes in an application and/or to accommodate use of the device 700 in different applications.

The design of the flow and pressure stabilization device 700, and particularly the plunger, button, bullet, or the like 226 attached to the valve diaphragm 738, can be desirable for various reasons. For example, the geometry of the button 226 (e.g., the outer profile being at least partially tapered, similar to other outflow control button designs disclosed herein) allows the Cv of the valve to be better controlled/more linear, effectively reducing the ability of the valve to maintain a constant backpressure, but providing a more linear downstream flow and pressure while increased upstream pressure variation allows the pulsation dampening features to be more effective.

In a metering pump application, one difficulty is that most metering pumps produce pulsating flow. The flow and pressure stabilization device 700, and other embodiments disclosed herein, can help to generate more uniform or linear flow downstream than is output by such a metering pump. With the features of these designs, including the plunger 226 described above, the system can, in some embodiments, provide more linear flow and pressure downstream of the valve (where it is needed) at the expense of greater flow and pressure variations upstream of the valve.

Some advantages of the flow and pressure stabilization device 700 (and other embodiments including an outflow control button or plunger) include (1) more linear flow is produced downstream of the valve, (2) can be tuned to specific process conditions by, among other things, adjusting the geometry of the plunger/button, and (3) can even be tuned in the field by, for example, having a series of replaceable plungers/buttons of different geometry that are interchangeable in one housing to match the device to multiple process conditions. In some embodiments, the replaceable plungers/buttons are provided as a plunger and diaphragm assembly, similar to as shown in FIG. 2J. This may be desirable if, for example, the plunger is intended to be permanently affixed to the diaphragm and/or to reduce the chance of a technician in the field damaging a diaphragm while trying to replace the button affixed to a particular diaphragm. One counterintuitive advantage of the flow and pressure stabilization device 700 (and other embodiments that include an outflow control button or plunger) is that, by increasing the flow and pressure pulsations upstream of the valve, the downstream flow and pressure is made more linear. For example, by combining an outflow control button with the diaphragm, the additional restriction in flow caused by the outflow control button will cause the upstream pressure to increase more than the upstream pressure would without an outflow control button (e.g., if just the diaphragm were used). This additional pressure acts against the charge gas in the gas chamber adjacent the bladder, leading to additional dampening in the fluid. In part, this additional dampening can provide smoother downstream flow. In addition, this additional pressure can be prevented, by the flow restriction of the outflow control button, from going downstream where it could decrease downstream flow and pressure consistency and/or linearity. Another benefit of the embodiments disclosed herein that include an outflow control button is that they may desirably experience little or no valve chatter in operation. Valve chatter can occur in a situation where a valve allows excessive flow relative to the system requirements. In such a situation, the valve can open and close rapidly, or flutter, instead of opening once per pump stroke. An outflow control button as disclosed herein can allow for more fine control over the flow through the valve, thus reducing or eliminating such chatter. Another way to describe such a situation is that, if you consider a valve to be a feedback and control mechanism, chatter can be referred to as dynamic instability in the control loop caused by excessive gain. When an outflow control button helps to restrict the fluid flow, however, it effectively reduces the gain in the system, thus reducing or eliminating valve chatter.

Various other modifications, adaptations, and alternative designs are of course possible in light of the above teachings. Therefore, it should be understood at this time that within the scope of the appended claims the invention may be practiced otherwise than as specifically described herein. It is contemplated that various combinations or subcombinations of the specific features and aspects of the embodiments disclosed above may be made and still fall within one or more of the inventions. Further, the disclosure herein of any particular feature, aspect, method, property, characteristic, quality, attribute, element, or the like in connection with an embodiment can be used in all other embodiments set forth herein. Accordingly, it should be understood that various features and aspects of the disclosed embodiments can be combined with or substituted for one another in order to form varying modes of the disclosed inventions. Thus, it is intended that the scope of the present inventions herein disclosed should not be limited by the particular disclosed embodiments described above. Moreover, while the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents, and alternatives falling within the spirit and scope of the various embodiments described and the appended claims. Any methods disclosed herein need not be performed in the order recited.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The headings used herein are for the convenience of the reader only and are not meant to limit the scope of the inventions or claims.

What is claimed is:

1. A flow and pressure stabilization device comprising:
a housing comprising a fluid inlet and a fluid outlet;
a first fluid chamber within the housing and in fluid communication with the fluid inlet;
a gas chamber within the housing;
a deformable bladder that separates the first fluid chamber from the gas chamber, the deformable bladder comprising a deformable longitudinally protruding portion shaped such that, when a pressure in the gas chamber is greater than a pressure in the first fluid chamber, the longitudinally protruding portion extends toward the first fluid chamber, with at least a portion of a volume of the gas chamber being positioned laterally inward of the longitudinally protruding portion, and with at least a portion of a volume of the first fluid chamber being positioned laterally outward of the longitudinally protruding portion;
a valve in fluid communication with the fluid outlet, the valve comprising:
a second fluid chamber;
a fluid port in fluid communication with the fluid outlet; and
a deformable diaphragm positioned adjacent to and biased toward the fluid port; and
a fluid passage that fluidly couples an outlet of the first fluid chamber to an inlet of the second fluid chamber.

2. The flow and pressure stabilization device of claim 1, wherein the valve further comprises a spring that biases the deformable diaphragm toward the fluid port.

3. The flow and pressure stabilization device of claim 2, wherein the valve further comprises an adjuster movable along a longitudinal direction to adjust a preload force on the spring.

4. The flow and pressure stabilization device of claim 1, wherein the housing comprises a first end and a second end, the gas chamber being positioned at the first end of the housing, and the valve being positioned at the second end of the housing.

5. The flow and pressure stabilization device of claim 4, wherein the fluid inlet and the fluid outlet are both positioned longitudinally between the gas chamber and the valve.

6. The flow and pressure stabilization device of claim 4, wherein the longitudinally protruding portion of the deformable bladder is configured to be biased toward the second end of the housing, and the deformable diaphragm is configured to be biased toward the first end of the housing.

7. The flow and pressure stabilization device of claim 1, wherein the deformable bladder and the deformable diaphragm are concentrically aligned along a longitudinal axis of the housing.

8. The flow and pressure stabilization device of claim 1, wherein a length of the fluid passage is no greater than 1.5 times a diameter of the first fluid chamber.

9. The flow and pressure stabilization device of claim 1, wherein the housing comprises a top body, a middle body, and a lower body,
wherein a portion of the deformable bladder is retained between the top body and the middle body, and
wherein a portion of the deformable diaphragm is retained between the middle body and the lower body.

10. The flow and pressure stabilization device of claim 9, wherein the middle body comprises the fluid inlet and the fluid outlet.

11. The flow and pressure stabilization device of claim 1, wherein the housing is constructed from plastic.

12. A flow and pressure stabilization device comprising:
a housing comprising a first end, a second end, a fluid inlet, and a fluid outlet;
a gas chamber positioned at the first end of the housing;
a first fluid chamber in fluid communication with the fluid inlet;
a deformable bladder that separates the first fluid chamber from the gas chamber, the deformable bladder positioned such that an increase in relative pressure of the first fluid chamber with respect to the gas chamber will tend to cause at least a portion of the deformable bladder to deform toward the first end of the housing;
a valve in fluid communication with the fluid outlet, the valve positioned at the second end of the housing, the valve comprising:
a second fluid chamber;
a deformable diaphragm positioned to deform responsive to pressure changes within the second fluid chamber; and
a fluid port in fluid communication with the fluid outlet, wherein the deformable diaphragm is biased toward the fluid port; and
a fluid passage that fluidly couples an outlet of the first fluid chamber to an inlet of the second fluid chamber.

13. The flow and pressure stabilization device of claim 12, wherein the deformable bladder and the deformable diaphragm are concentrically aligned along a longitudinal axis of the housing.

14. The flow and pressure stabilization device of claim 12, wherein the fluid inlet and the fluid outlet are positioned longitudinally between the gas chamber and the second fluid chamber.

15. The flow and pressure stabilization device of claim 12, wherein the valve further comprises a spring that biases the deformable diaphragm toward the fluid port.

16. The flow and pressure stabilization device of claim 15, wherein the valve further comprises an adjuster movable along a longitudinal direction to adjust a preload force on the spring.

17. The flow and pressure stabilization device of claim 12, wherein the deformable bladder comprises a deformable longitudinally protruding portion shaped such that, when a pressure in the gas chamber is greater than a pressure in the first fluid chamber, the longitudinally protruding portion extends toward the first fluid chamber, with at least a portion of a volume of the gas chamber being positioned laterally inward of the longitudinally protruding portion, and with at least a portion of a volume of the first fluid chamber being positioned laterally outward of the longitudinally protruding portion.

18. The flow and pressure stabilization device of claim 12, wherein a length of the fluid passage is no greater than 1.5 times a diameter of the first fluid chamber.

19. The flow and pressure stabilization device of claim 12, wherein the housing comprises a top body, a middle body, and a lower body,
wherein the middle body comprises the fluid inlet and the fluid outlet,
wherein a portion of the deformable bladder is retained between the top body and the middle body, and
wherein a portion of the deformable diaphragm is retained between the middle body and the lower body.

20. The flow and pressure stabilization device of claim 12, wherein the housing is constructed from plastic.

21. The flow and pressure stabilization device of claim 1, wherein a fluid flow path from the fluid inlet to the fluid outlet comprises, in order, the fluid inlet, the first fluid chamber, the fluid passage, the second fluid chamber, the fluid port, and the fluid outlet.

22. The flow and pressure stabilization device of claim 12, wherein a fluid flow path from the fluid inlet to the fluid outlet comprises, in order, the fluid inlet, the first fluid chamber, the fluid passage, the second fluid chamber, the fluid port, and the fluid outlet.

\* \* \* \* \*